United States Patent
Ferguson et al.

(10) Patent No.: US 11,556,970 B2
(45) Date of Patent: Jan. 17, 2023

(54) SYSTEMS AND METHODS FOR PERSONAL VERIFICATION FOR AUTONOMOUS VEHICLE DELIVERIES

(71) Applicant: Nuro, Inc., Mountain View, CA (US)

(72) Inventors: David Ferguson, San Francisco, CA (US); Jiajun Zhu, Palo Alto, CA (US); Nan Ransohoff, San Francisco, CA (US)

(73) Assignee: NURO, INC., Mountain View, CA (US)

( * ) Notice: Subject to any disclaimer, the term of this patent is extended or adjusted under 35 U.S.C. 154(b) by 228 days.

(21) Appl. No.: 16/158,963

(22) Filed: Oct. 12, 2018

(65) Prior Publication Data

US 2019/0047515 A1 Feb. 14, 2019

Related U.S. Application Data

(63) Continuation-in-part of application No. PCT/US2018/044361, filed on Jul. 30, 2018.
(Continued)

(51) Int. Cl.
*G06Q 20/00* (2012.01)
*G06Q 20/12* (2012.01)
(Continued)

(52) U.S. Cl.
CPC .......... *G06Q 30/0631* (2013.01); *A23L 2/52* (2013.01); *A23L 5/00* (2016.08); *A23L 7/109* (2016.08);
(Continued)

(58) Field of Classification Search
CPC ..... G05F 1/0061; B60R 25/25; B60R 25/252; B60R 19/18; B60R 19/483; B60R 21/34;
(Continued)

(56) References Cited

U.S. PATENT DOCUMENTS

| | | | |
|---|---|---|---|
| 6,857,073 B2* | 2/2005 | French | G06F 21/31 713/168 |
| 7,003,669 B2* | 2/2006 | Monk | G06Q 50/26 713/168 |

(Continued)

FOREIGN PATENT DOCUMENTS

| | | |
|---|---|---|
| CN | 105575009 A | 5/2016 |
| CN | 107609529 A | 1/2018 |

(Continued)

OTHER PUBLICATIONS

International Search Report and Written Opinion issued in International Application No. PCT/US2018/044361 dated Oct. 10, 2018.
(Continued)

*Primary Examiner* — Theodore C Parsons

(57) ABSTRACT

In accordance with aspects of the present disclosure, an autonomous robot vehicle is disclosed. In various embodiments, the autonomous robot vehicle includes a conveyance system, a securable compartment configured to autonomously lock and unlock where the securable compartment contains an item for delivery to a particular individual, a personal identification reader, at least one processor, and a memory storing instructions. The instructions, when executed by the processor(s), cause the autonomous robot vehicle to, autonomously, travel to a destination location of the particular individual, capture by the personal identification reader at the destination location a personal identification object, determine that the captured personal identification object matches an identity of the particular individual, and unlock the securable compartment based on the determination.

26 Claims, 12 Drawing Sheets

Related U.S. Application Data

(60) Provisional application No. 62/538,538, filed on Jul. 28, 2017.

(51) Int. Cl.

| | | |
|---|---|---|
| *G07F 17/12* | (2006.01) | |
| *G06F 16/955* | (2019.01) | |
| *A23L 2/52* | (2006.01) | |
| *A47J 37/06* | (2006.01) | |
| *A47J 47/00* | (2006.01) | |
| *B60H 1/00* | (2006.01) | |
| *B60P 1/36* | (2006.01) | |
| *B60P 3/025* | (2006.01) | |
| *B60R 19/18* | (2006.01) | |
| *G06K 7/14* | (2006.01) | |
| *G06K 19/06* | (2006.01) | |
| *G06Q 20/18* | (2012.01) | |
| *G07F 17/00* | (2006.01) | |
| *G07C 5/02* | (2006.01) | |
| *G07C 5/08* | (2006.01) | |
| *G06V 20/56* | (2022.01) | |
| *G06V 20/64* | (2022.01) | |
| *G06Q 30/02* | (2012.01) | |
| *G06Q 30/06* | (2012.01) | |
| *G08G 1/04* | (2006.01) | |
| *B60P 3/00* | (2006.01) | |
| *B60R 21/34* | (2011.01) | |
| *B65G 67/24* | (2006.01) | |
| *G01C 21/34* | (2006.01) | |
| *G05D 1/00* | (2006.01) | |
| *G05D 1/02* | (2020.01) | |
| *G05D 1/12* | (2006.01) | |
| *G06K 7/10* | (2006.01) | |
| *G06Q 10/06* | (2012.01) | |
| *G06Q 10/08* | (2012.01) | |
| *G06Q 50/12* | (2012.01) | |
| *G06Q 50/28* | (2012.01) | |
| *G08G 1/00* | (2006.01) | |
| *H04L 67/12* | (2022.01) | |
| *G06N 20/00* | (2019.01) | |
| *B60R 25/25* | (2013.01) | |
| *A23L 5/00* | (2016.01) | |
| *A23L 7/109* | (2016.01) | |
| *G06Q 50/30* | (2012.01) | |
| *G06K 19/07* | (2006.01) | |
| *H04W 4/024* | (2018.01) | |
| *H04W 4/40* | (2018.01) | |
| *G01C 21/20* | (2006.01) | |
| *B60R 19/48* | (2006.01) | |
| *G06F 3/0484* | (2022.01) | |
| *B60R 21/36* | (2011.01) | |
| *H04N 5/76* | (2006.01) | |
| *H05B 6/68* | (2006.01) | |

(52) U.S. Cl.
CPC .......... *A47J 37/0658* (2013.01); *A47J 47/00* (2013.01); *B60H 1/00364* (2013.01); *B60H 1/00735* (2013.01); *B60P 1/36* (2013.01); *B60P 3/007* (2013.01); *B60P 3/0257* (2013.01); *B60R 19/18* (2013.01); *B60R 19/483* (2013.01); *B60R 21/34* (2013.01); *B60R 25/25* (2013.01); *B60R 25/252* (2013.01); *B65G 67/24* (2013.01); *G01C 21/20* (2013.01); *G01C 21/343* (2013.01); *G01C 21/3438* (2013.01); *G01C 21/3453* (2013.01); *G05D 1/0027* (2013.01); *G05D 1/0033* (2013.01); *G05D 1/0038* (2013.01); *G05D 1/0061* (2013.01); *G05D 1/0088* (2013.01); *G05D 1/0094* (2013.01); *G05D 1/0212* (2013.01); *G05D 1/0214* (2013.01); *G05D 1/0223* (2013.01); *G05D 1/0231* (2013.01); *G05D 1/0276* (2013.01); *G05D 1/0291* (2013.01); *G05D 1/12* (2013.01); *G06F 16/955* (2019.01); *G06K 7/10297* (2013.01); *G06K 7/10722* (2013.01); *G06K 7/1413* (2013.01); *G06K 19/06028* (2013.01); *G06K 19/0723* (2013.01); *G06N 20/00* (2019.01); *G06Q 10/0631* (2013.01); *G06Q 10/0635* (2013.01); *G06Q 10/06315* (2013.01); *G06Q 10/08* (2013.01); *G06Q 10/083* (2013.01); *G06Q 10/0832* (2013.01); *G06Q 10/0833* (2013.01); *G06Q 10/0834* (2013.01); *G06Q 10/0835* (2013.01); *G06Q 10/0837* (2013.01); *G06Q 10/08355* (2013.01); *G06Q 20/00* (2013.01); *G06Q 20/127* (2013.01); *G06Q 20/18* (2013.01); *G06Q 30/0265* (2013.01); *G06Q 30/0266* (2013.01); *G06Q 30/0645* (2013.01); *G06Q 50/12* (2013.01); *G06Q 50/28* (2013.01); *G06Q 50/30* (2013.01); *G06V 20/56* (2022.01); *G06V 20/64* (2022.01); *G07C 5/02* (2013.01); *G07C 5/08* (2013.01); *G07F 17/0057* (2013.01); *G07F 17/12* (2013.01); *G08G 1/04* (2013.01); *G08G 1/202* (2013.01); *H04L 67/12* (2013.01); *H04W 4/024* (2018.02); *H04W 4/40* (2018.02); *A23V 2002/00* (2013.01); *B60R 21/36* (2013.01); *B60R 2021/346* (2013.01); *G05D 2201/0207* (2013.01); *G05D 2201/0213* (2013.01); *G06F 3/0484* (2013.01); *G08G 1/22* (2013.01); *H04N 5/76* (2013.01); *H05B 6/688* (2013.01)

(58) Field of Classification Search
CPC .. G05D 1/0088; G05D 1/0027; G05D 1/0033; G05D 1/0038; G05D 1/0061; G05D 1/0094; G05D 1/0212; G05D 1/0214; G05D 1/0223; G05D 1/0231; G05D 1/0276; G05D 1/0291; G05D 1/12; G05D 1/0295; G05D 1/0297; G06K 7/10722; G06K 7/1413; G06K 7/10297; G06K 19/06028; G06K 19/0723; G06Q 10/083; G06Q 30/0631; G06Q 10/0631; G06Q 10/06315; G06Q 10/0635; G06Q 10/08; G06Q 10/0832; G06Q 10/0833; G06Q 10/0834; G06Q 10/0835; G06Q 10/08355; G06Q 10/0837; G06Q 20/00; G06Q 20/127; G06Q 20/18; G06Q 30/0265; G06Q 30/0266; G06Q 30/0645; G06Q 50/12; G06Q 50/28; G06Q 50/30; G06Q 10/00; A23L 2/52; A23L 5/00; A23L 7/109; A47J 3/0658; A47J 47/00; B60H 1/00364; B60H 1/00735; B60P 1/36; B60P 3/007; B60P 3/0257; B65G 7/24; G01C 21/20; G01C 21/343; G01C 21/3438; G01C 21/3453; G06F 16/955; G06F 3/017; G06N 20/00; G06V 20/56; G06V 20/64; G07C 5/02; G07C 5/08; G07C 9/00896; G07C 9/00563; G07C 9/00571; G07C 9/28; G07C 2009/0092; G07C 2209/63; H05B 6/688; B64C 2201/128; B64C 2201/141

See application file for complete search history.

(56) References Cited

U.S. PATENT DOCUMENTS

| | | | | |
|---|---|---|---|---|
| 7,421,097 | B2* | 9/2008 | Hamza | G06V 40/172 |
| | | | | 235/382 |
| 8,113,421 | B2 | 2/2012 | Yepez et al. | |
| 8,322,605 | B2* | 12/2012 | Ludlow | G06F 16/2468 |
| | | | | 235/380 |
| 8,744,642 | B2* | 6/2014 | Nemat-Nasser | G06K 9/00845 |
| | | | | 701/1 |
| 9,043,012 | B2* | 5/2015 | Davey | B25J 11/009 |
| | | | | 700/216 |
| 9,256,852 | B1* | 2/2016 | Myllymaki | B60P 3/007 |
| 9,381,890 | B2* | 7/2016 | Lee | B60K 28/02 |
| 9,495,586 | B1* | 11/2016 | Hagen | G06F 21/32 |
| 9,619,723 | B1* | 4/2017 | Chow | G06K 9/00288 |
| 9,665,784 | B2* | 5/2017 | Derakhshani | A61B 5/0077 |
| 9,811,848 | B2* | 11/2017 | Reuss | G06Q 20/4014 |
| 10,248,120 | B1 | 4/2019 | Siegel et al. | |
| 10,514,690 | B1 | 12/2019 | Siegel et al. | |
| 2002/0087413 | A1* | 7/2002 | Mahaffy | G10L 13/00 |
| | | | | 705/16 |
| 2004/0172260 | A1 | 9/2004 | Junger et al. | |
| 2006/0138223 | A1* | 6/2006 | Schar | G07C 9/37 |
| | | | | 235/384 |
| 2010/0084426 | A1 | 4/2010 | Devers et al. | |
| 2011/0135189 | A1 | 6/2011 | Lee | |
| 2014/0081445 | A1 | 3/2014 | Villamar | |
| 2014/0254896 | A1 | 9/2014 | Zhou et al. | |
| 2014/0330456 | A1 | 11/2014 | Lopez Morales et al. | |
| 2015/0006005 | A1 | 1/2015 | Yu et al. | |
| 2017/0046773 | A1 | 2/2017 | Hendricks, II et al. | |
| 2017/0154371 | A1 | 6/2017 | Harvey | |
| 2017/0154483 | A1 | 6/2017 | Cordiner et al. | |
| 2017/0174343 | A1 | 6/2017 | Erickson et al. | |
| 2017/0313514 | A1 | 11/2017 | Lert, Jr. et al. | |
| 2018/0096270 | A1 | 4/2018 | High et al. | |
| 2018/0101701 | A1* | 4/2018 | Barinov | H04L 63/12 |
| 2018/0137454 | A1 | 5/2018 | Kulkarni et al. | |
| 2018/0144302 | A1* | 5/2018 | Murray | G06K 9/00885 |
| 2018/0165638 | A1 | 6/2018 | Wilkinson et al. | |
| 2018/0232839 | A1 | 8/2018 | Heinla et al. | |
| 2018/0349834 | A1 | 12/2018 | Heinla et al. | |
| 2019/0050921 | A1* | 2/2019 | Ryner | G06Q 20/18 |
| 2019/0064847 | A1 | 2/2019 | Ferguson et al. | |
| 2019/0206174 | A1* | 7/2019 | Miu | G07F 9/026 |
| 2019/0270204 | A1 | 9/2019 | Kawamura et al. | |
| 2019/0318306 | A1 | 10/2019 | Mere | |
| 2019/0369641 | A1 | 12/2019 | Gillett | |
| 2020/0174494 | A1 | 6/2020 | Lessels | |

FOREIGN PATENT DOCUMENTS

| | | |
|---|---|---|
| CN | 107644492 A | 1/2018 |
| CN | 108139754 A | 6/2018 |
| WO | 2017064202 A1 | 4/2017 |
| WO | 2017085314 A1 | 5/2017 |

OTHER PUBLICATIONS

International Search Report dated Oct. 9, 2019 and Written Opinion completed Oct. 1, 2019 corresponding to counterpart Int'l Patent Application PCT/US2019/043893.

Google, "Smart Robot Delivery", Google Search, retrieved from Internet Jun. 7, 2020, 2 pages.

International Search Report and Written Opinion in counterpart International Application No. PCT/US2019/043897, dated Oct. 31, 2019, 17 pages.

The Corrupt Senate, "[ANH] Droids for Sale (HD)", Dec. 31, 2016, https://www.youtube.com/watch?v=vxEOZOSnlgk, 1 page.

Google, "Autonomous Vehicle Deliveries, Biometric Authentication Receiver", Google Search, retrieved from Internet May 26, 2020, 2 pages.

* cited by examiner

SYSTEMS AND METHODS FOR PERSONAL VERIFICATION FOR AUTONOMOUS VEHICLE DELIVERIES

CROSS-REFERENCE TO RELATED APPLICATIONS

The present application is a continuation-in-part of International Application No. PCT/US2018/044361, filed on Jul. 30, 2018, which claims the benefit of U.S. Provisional Application No. 62/538,538, filed on Jul. 28, 2017. The entire contents of each of the foregoing applications are hereby incorporated by reference.

FIELD OF THE TECHNOLOGY

The present application relates to autonomous vehicles, and in particular, to systems and methods for personal verification for autonomous vehicle deliveries or services.

BACKGROUND

The field of fully-autonomous and/or semi-autonomous robots is a growing field of innovation. Robots are being used for many purposes including warehouse inventory operations, household vacuuming robots, hospital delivery robots, sanitation robots, and military or defense applications.

In the consumer space, handling and delivery of items by autonomous vehicles could improve society in many ways. For example, rather than spending time driving to a store, a person can instead engage in productive work while waiting for an autonomous vehicle to deliver the items. With fewer vehicles on the road, traffic conditions would also improve. For example, instead of several people driving to stores in several vehicles, a single autonomous vehicle could deliver items to those people and thereby reduce the number of vehicles on the road. Accordingly, there is interest in developing technologies for delivery of items and services via an autonomous vehicle.

SUMMARY

This disclosure relates to a fully-autonomous and/or semi-autonomous robot fleet and, in particular, to verification of identity and/or age in connection with autonomous vehicle deliveries and services.

In accordance with aspects of the present disclosure, an autonomous robot vehicle includes a conveyance system, a securable compartment configured to autonomously lock and unlock where the securable compartment contains an item for delivery to a particular individual, a personal identification reader, at least one processor, and a memory storing instructions. The instructions, when executed by the at least one processor, cause the autonomous robot vehicle to, autonomously, travel to a destination location of the particular individual, capture by the personal identification reader at the destination location a personal identification object, determine that the captured personal identification object matches an identity of the particular individual, and unlock the securable compartment based on the determination.

In various embodiments, the personal identification reader includes a camera and the personal identification object includes a government-issued photo identification card. In various embodiments, in the determining, the instructions, when executed by the at least one processor, cause the autonomous robot vehicle to determine that information in the captured government-issued photo identification card matches previously stored data of the particular individual.

In various embodiments, the personal identification reader includes a camera and the personal identification object includes a face.

In various embodiments, the personal identification reader includes a fingerprint scanner and the personal identification object includes a fingerprint.

In various embodiments, in the determining, the instructions, when executed by the at least one processor, cause the autonomous robot vehicle to determine that the captured face matches previously stored face data of the particular individual.

In various embodiments, the instructions, when executed by the at least one processor, further cause the autonomous robot vehicle to capture at the destination location a government-issued photo identification card, and in the determining, the instructions, when executed by the at least one processor, cause the autonomous robot vehicle to determine that the captured face matches information in the captured government-issued photo identification card.

In various embodiments, the instructions, when executed by the at least one processor, further cause the autonomous robot vehicle to transmit the captured face to a remote human operator, and receive an indication from the remote human operator that the captured face matches the identity of the particular individual.

In various embodiments, the autonomous robot vehicle includes a sensor system that uses at least one of LiDAR or RADAR, and the instructions, when executed by the at least one processor, further cause the autonomous robot vehicle to capture the face by the sensor system at the destination location to provide sensor face data, and determine that the face is a three-dimensional face based on the sensor face data.

In various embodiments, the instructions, when executed by the at least one processor, further cause the autonomous robot vehicle to capture by the camera at the destination location the face at a different angle, and determine that the face is a three-dimensional face based on parallax effects of the face, where the parallax effects are based on the captured face and the captured face at the different angle.

In various embodiments, the instructions, when executed by the at least one processor, further cause the autonomous robot vehicle to request a facial movement, capture the facial movement, and determine that the face is a live face based on the captured facial movement.

In various embodiments, the item for delivery to the particular individual is a prescription drug for an individual named in a prescription, and in the determining, the instructions, when executed by the at least one processor, cause the autonomous robot vehicle to determine that the personal identification object matches an identity of the individual named in the prescription.

In various embodiments, the instructions, when executed by the at least one processor, further cause the autonomous robot vehicle to obtain additional verification by requesting, at the destination location, responses to prompts for information regarding at least one of: a prescribing physician, a pharmacist, a medication, or a medical history.

In various embodiments, in the determining, the instructions, when executed by the at least one processor, further cause the autonomous robot vehicle to transmit the captured personal identification object to a remote system for identity verification, receive an indication from the remote system that the identity verification was verified, and determine that the captured personal identity object matches the identity of the particular individual based on the indication received from the remote system.

In accordance with aspects of the present disclosure, a system is disclosed for personal verification for autonomous robot vehicles having a securable compartment configured to autonomously lock and unlock. The system includes at least one processor and a memory storing instructions which, when executed by the at least one processor, cause the system to communicate instructions to the autonomous vehicle to travel to a destination location of a particular individual with the securable compartment of the autonomous robot vehicle containing an item for delivery to the particular individual, receive an indication, from the autonomous robot vehicle, of a location of the autonomous vehicle, receive from a device of the particular individual a personal identification object captured by the device and a location of the device, determine that the location of the device is within a predetermined distance from the location of the autonomous vehicle and that the personal identification object captured by the device matches an identity of the particular individual, and communicate instructions to the autonomous vehicle to unlock the securable compartment based on the determination.

In various embodiments, the personal identification object includes a government-issued photo identification card. In various embodiments, in the determining, the instructions, when executed by the at least one processor, cause the system to determine that information in the captured government-issued photo identification card matches previously stored data of the particular individual.

In various embodiments, the personal identification object includes a face.

In various embodiments, in the determining, the instructions, when executed by the at least one processor, cause the system to determine that the captured face matches previously stored face data of the particular individual.

In various embodiments, the instructions, when executed by the at least one processor, further cause the system to communicate a request to the device to capture the face at a different angle, receive from the device a capture of the face at the different angle, and determine that the face is a three-dimensional face based on parallax effects of the face, where the parallax effects are based on the captured face and the capture of the face at the different angle.

In various embodiments, the instructions, when executed by the at least one processor, further cause the system to communicate a request to the device to capture a facial movement, receive from the device the facial movement captured by the device, and determine that the face is a live face based on the captured facial movement.

In various embodiments, the item for delivery to the particular individual is a prescription drug for an individual named in a prescription, and in the determining, the instructions, when executed by the at least one processor, cause the system to determine that the personal identification object matches an identity of the individual named in the prescription.

In various embodiments, the instructions, when executed by the at least one processor, further cause the system to obtain additional verification by communicating a request, to the device, for responses to prompts for information regarding at least one of: a prescribing physician, a pharmacist, a medication, or a medical history.

Further details and aspects of exemplary embodiments of the present disclosure are described in more detail below with reference to the appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying drawings of which.

DETAILED DESCRIPTION

Figure 1:
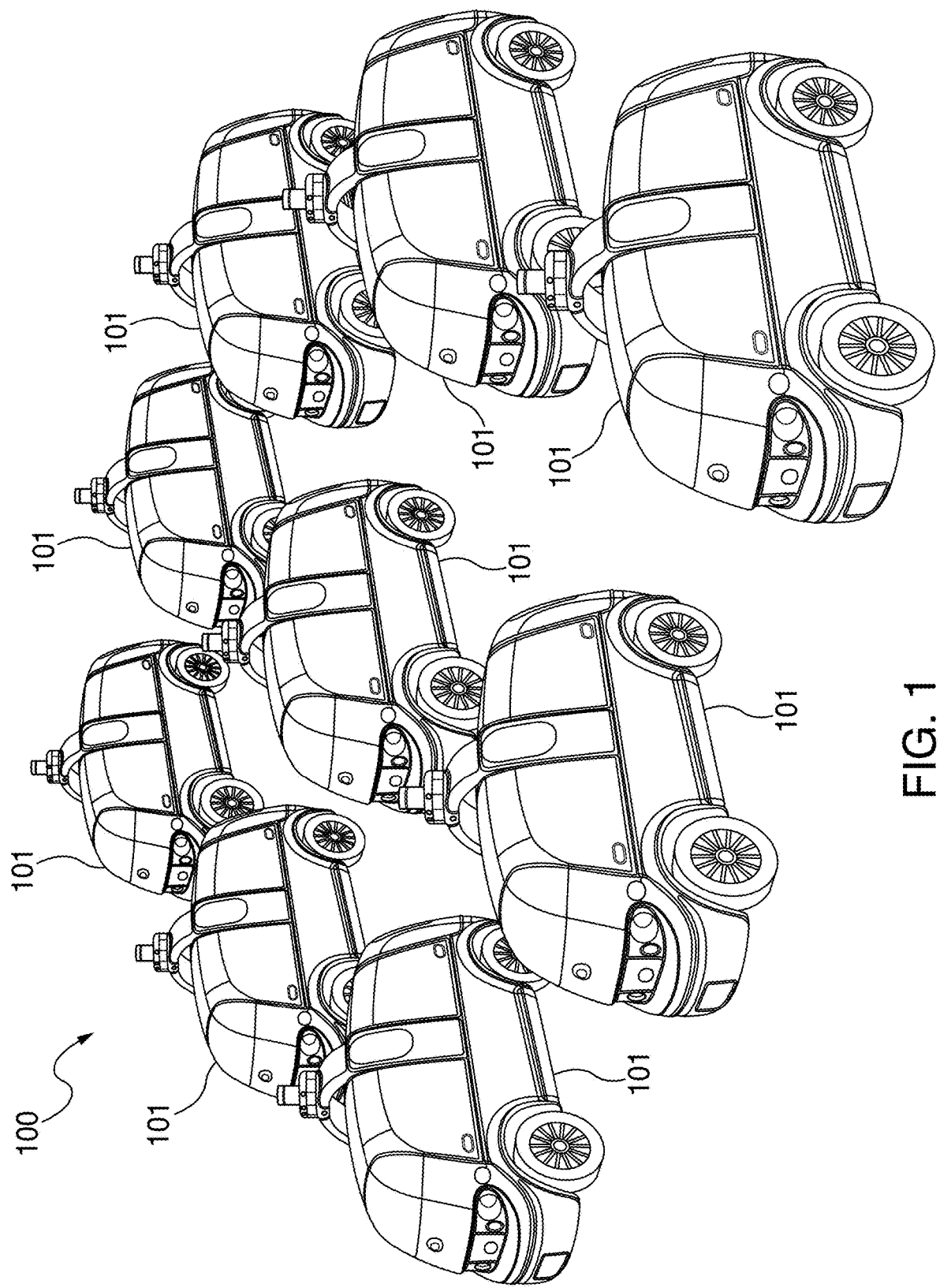
FIG. 1 is an exemplary view an autonomous robot fleet, wherein each vehicle within a fleet or sub-fleet can be branded for an entity.

This disclosure relates to a fully-autonomous and/or semi-autonomous robot fleet and, in particular, to robot vehicles for transporting or retrieving deliveries in either open unstructured outdoor environments or closed environments.

Provided herein is a robot fleet having robot vehicles operating fully-autonomously or semi-autonomously and a fleet management module for coordination of the robot fleet, where each robot within the fleet is configured for transporting, delivering or retrieving goods or services and is capable of operating in an unstructured open or closed environment. Each robot can include a power system, a conveyance system, a navigation module, at least one securable compartment or multiple securable compartments to hold goods, a controller configurable to associate each of the securable compartments to an assignable customer, a customer group within a marketplace, or provider and provide entry when authorized, a communication module and a processor configured to manage the conveyance system, the navigation module, the sensor system, the communication module and the controller.

As used herein, the term "autonomous" includes fully-autonomous, semi-autonomous, and any configuration in which a vehicle can travel in a controlled manner for a period of time without human intervention.

As used herein, the term "fleet," "sub-fleet," and like terms are used to indicate a number of land vehicles, watercraft or aircraft operating together or under the same ownership. In some embodiments the fleet or sub-fleet is engaged in the same activity. In some embodiments, the fleet or sub-fleet are engaged in similar activities. In some embodiments, the fleet or sub-fleet are engaged in different activities.

As used herein, the term "robot," "robot vehicle," "robot fleet," "vehicle," "all-terrain vehicle," and like terms are used to indicate a mobile machine that transports cargo, items, and/or goods. Typical vehicles include cars, wagons, vans, unmanned motor vehicles (e.g., tricycles, trucks, trailers, buses, etc.), unmanned railed vehicles (e.g., trains, trams, etc.), unmanned watercraft (e.g., ships, boats, ferries, landing craft, barges, rafts, etc.), aerial drones, unmanned hovercraft (air, land and water types), unmanned aircraft, and even including unmanned spacecraft.

As used herein, the term "compartment" is used to indicate an internal bay of a robot vehicle that has a dedicated door at the exterior of the vehicle for accessing the bay, and also indicates an insert secured within the bay. The term "sub-compartment" is generally used to indicate a subdivision or portion of a compartment. When used in the context of a compartment or sub-compartment, the term "module" may be used to indicate one or more compartments or sub-compartments.

As used herein, the term "user," "operator," "fleet operator," and like terms are used to indicate the entity that owns or is responsible for managing and operating the robot fleet.

As used herein, the term "customer" and like terms are used to indicate the entity that requests the services provided the robot fleet.

As used herein, the term "provider," "business," "vendor," "third party vendor," and like terms are used to indicate an entity that works in concert with the fleet owner or operator to utilize the services of the robot fleet to deliver the provider's product from and or return the provider's product to the provider's place of business or staging location.

As used herein, the term "server," "computer server," "central server," "main server," and like terms are used to indicate a computer or device on a network that manages the fleet resources, namely the robot vehicles.

As used herein, the term "controller" and like terms are used to indicate a device that controls the transfer of data from a computer to a peripheral device and vice versa. For example, disk drives, display screens, keyboards, and printers all require controllers. In personal computers, the controllers are often single chips. As used herein the controller is commonly used for managing access to components of the robot such as the securable compartments.

As used herein a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task. As used herein the fleet management module includes software modules for managing various aspects and functions of the robot fleet.

As used herein, the term "processor," "digital processing device" and like terms are used to indicate a microprocessor or central processing unit (CPU). The CPU is the electronic circuitry within a computer that carries out the instructions of a computer program by performing the basic arithmetic, logical, control and input/output (I/O) operations specified by the instructions.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatus used to store data or programs on a temporary or permanent basis. In some embodiments, the device is volatile memory and requires power to maintain stored information. In some embodiments, the device is non-volatile memory and retains stored information when the digital processing device is not powered. In some embodiments, the non-volatile memory includes flash memory. In some embodiments, the non-volatile memory includes dynamic random-access memory (DRAM). In some embodiments, the non-volatile memory includes ferroelectric random access memory (FRAM). In some embodiments, the non-volatile memory includes phase-change random access memory (PRAM). In some embodiments, the device is a storage device including, by way of non-limiting examples, CD-ROMs, DVDs, flash memory devices, magnetic disk drives, magnetic tapes drives, optical disk drives, and cloud computing based storage. In some embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In some embodiments, the display is a thin film transistor liquid crystal display (TFT-LCD). In some embodiments, the display is an organic light emitting diode (OLED) display. In various some embodiments, on OLED display is a passive-matrix OLED (PMOLED) or active-matrix OLED (AMOLED) display. In some embodiments, the display is a plasma display. In some embodiments, the display is a video projector. In some embodiments, the display is interactive (e.g., having a touch screen or a sensor such as a camera, a 3D sensor, a LiDAR, a radar, etc.) that can detect user interactions/gestures/responses and the like. In still some embodiments, the display is a combination of devices such as those disclosed herein.

The Fleet of Robot Vehicles

Provided herein is a robot fleet 100, as illustrated in FIG. 1, having robot vehicles 101, with each one operating fully-autonomously or semi-autonomously.

As illustrated in FIGS. 3-6, one exemplary configuration of a robot 101 is a vehicle configured for land travel, such as a small fully-autonomous (or semi-autonomous) automobile. The exemplary fully-autonomous (or semi-autonomous) automobile is narrow (i.e., 2-5 feet wide), low mass and low center of gravity for stability, having multiple secure compartments assignable to one or more customers, retailers and/or vendors, and designed for moderate working speed ranges (i.e., 1.0-45.0 mph) to accommodate inner-city and residential driving speeds. Additionally, in some embodiments, the land vehicle robot units in the fleet are configured with a maximum speed range from 1.0 mph to about 90.0 mph for high speed, intrastate or interstate driving. Each robot in the fleet is equipped with onboard sensors 170 (e.g., cameras (running at a high frame rate, akin to video), LiDAR, radar, ultrasonic sensors, microphones, etc.) and internal computer processing to constantly determine where it can safely navigate, what other objects are around each robot and what it may do.

In in some embodiments, the robot fleet is fully-autonomous.

In in some embodiments, the robot fleet is semi-autonomous. In some embodiments, it may be necessary to have human interaction between the robot 101, the fleet operator 200, the provider 204 and/or the customer 202 to address previously unforeseen issues (e.g., a malfunction with the navigation module; provider inventory issues; unanticipated traffic or road conditions; or direct customer interaction after the robot arrives at the customer location).

In in some embodiments, the robot fleet 100 is controlled directly by the user 200. In some embodiments, it may be necessary to have direct human interaction between the robot 101 and/or the fleet operator 200 to address maintenance issues such as mechanical failure, electrical failure or a traffic accident.

In some embodiments, the robot fleet is configured for land travel. In some embodiments, each robot land vehicle in the fleet is configured with a working speed range from 13.0 mph to 45.0 mph. In some embodiments, the land vehicle robot units in the fleet are configured with a maximum speed range from 13.0 mph to about 90.0 mph.

In some embodiments, the robot fleet is configured for water travel as a watercraft and is configured with a working speed range from 1.0 mph to 45.0 mph.

In some embodiments, the robot fleet is configured for hover travel as an over-land or over-water hovercraft and is configured with a working speed range from 1.0 mph to 60.0 mph.

In some embodiments, the robot fleet is configured for air travel as an aerial drone or aerial hovercraft and is configured with a working speed range from 1.0 mph to 80.0 mph.

In some embodiments of the robot fleet, the autonomous robots within the fleet are operated on behalf of third party vendor/service provider.

For example, a fleet management service is established to provide a roving delivery service for a third party beverage/food provider (e.g., a coffee service/experience for a third party vendor (i.e., Starbucks)). It is conceived that the fleet management service would provide a sub-fleet of "white label" vehicles carrying the logo and products of that third party beverage/food provider to operate either fully-autonomously or semi-autonomously to provide this service.

In some embodiments of the robot fleet, the autonomous robots within the fleet are further configured to be part of a sub-fleet of autonomous robots, and each sub-fleet is configured to operate independently or in tandem with multiple sub-fleets having two or more sub-fleets (100-a, 100-b).

For example, a package delivery service is configured to offer multiple levels of service such as "immediate dedicated rush service," "guaranteed morning/afternoon delivery service," or "general delivery service." A service provider could then have a dedicated sub-fleet of delivery vehicles for each type of service within their overall fleet of vehicles. In yet another example, a third party has priority over a certain number of vehicles in the fleet. In so doing, they can guarantee a certain level of responsiveness. When they aren't using the vehicles, the vehicles are used for general services within the fleet (e.g., other third parties).

In some embodiments, the robot fleet is controlled directly by the user.

In some embodiments, there will likely be times when a vehicle breaks down, has an internal system or module failure or is in need of maintenance. For example, in the event that the navigation module should fail, each robot within the fleet is configurable to allow for direct control of the robot's processor to override the conveyance and sensor systems (i.e., cameras, etc.) by a fleet operator to allow for the safe return of the vehicle to a base station for repair.

The Operating Environments

In some embodiments, the unstructured open environment is a non-confined geographic region accessible by navigable pathways, including, for example, public roads, private roads, bike paths, open fields, open public lands, open private lands, pedestrian walkways, lakes, rivers or streams.

In some embodiments, the closed environment is a confined, enclosed or semi-enclosed structure accessible by navigable pathways, including, for example, open areas or rooms within commercial architecture, with or without structures or obstacles therein, airspace within open areas or rooms within commercial architecture, with or without structures or obstacles therein, public or dedicated aisles, hallways, tunnels, ramps, elevators, conveyors, or pedestrian walkways.

In some embodiments, the unstructured open environment is a non-confined airspace or even near-space environment which includes all main layers of the Earth's atmosphere including the troposphere, the stratosphere, the mesosphere, the thermosphere and the exosphere.

In some embodiments, the navigation module controls routing of the conveyance system of the robots in the fleet in the unstructured open or closed environments.

The Fleet Management Module

In some embodiments of the robot fleet 100, the fleet includes a fleet management module 120 (associated with a central server) for coordination of the robot fleet 100 and assignment of tasks for each robot 101 in the fleet. The fleet management module coordinates the activity and positioning of each robot in the fleet. In addition to communicating with the robot fleet, fleet owner/operator and/or user, the fleet management module also communicates with providers/vendors/businesses and customers to optimize behavior of the entire system.

The fleet management module works in coordination with a central server 110, typically located in a central operating facility owned or managed by the fleet owner 200.

Figure 11:
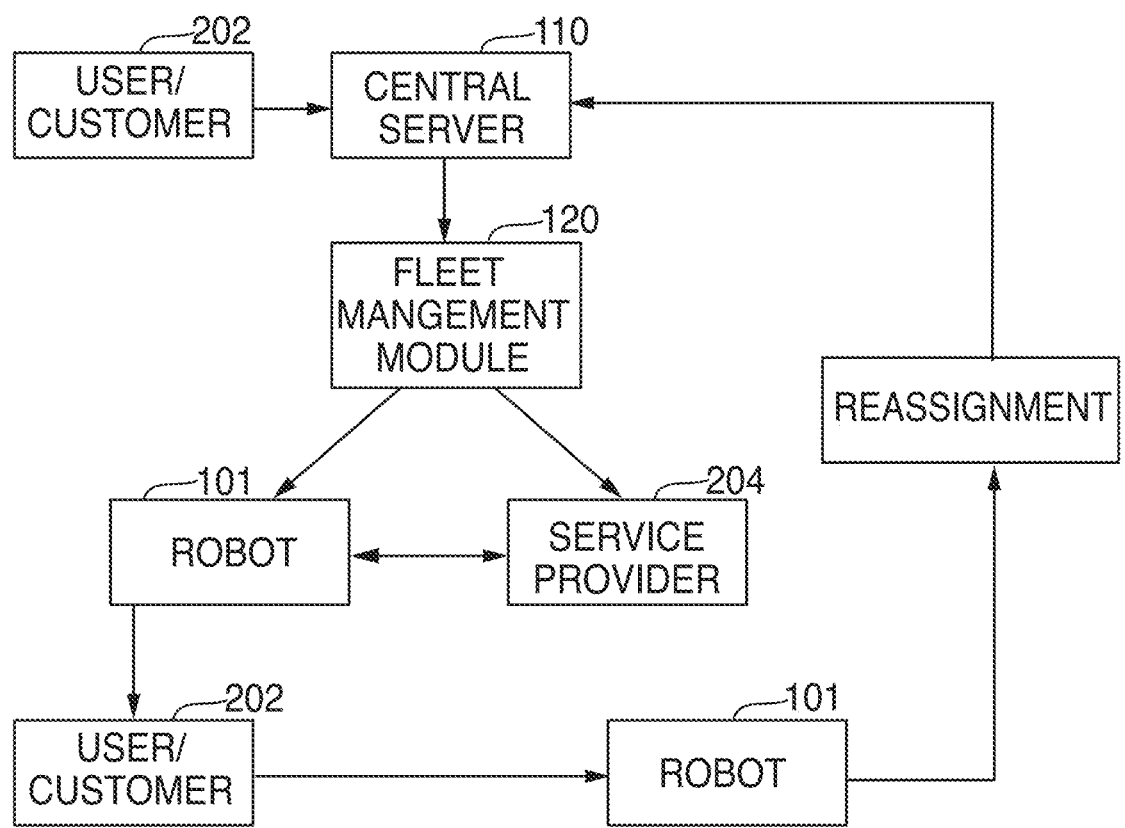
FIG. 11 is an exemplary flowchart representation of the logic for a fleet management control module associated with a central server for the robot fleet.

As illustrated in FIG. 11, in one embodiment, a request is sent to a main server 110 (typically located at the fleet owner's or fleet manager's location), which then communicates with the fleet management module 120. The fleet management module then relays the request to the appropriate provider 204 of the service (e.g., restaurant, delivery service, vendor or retailer) and an appropriate robot or robots 101 in the fleet. The best appropriate robot(s) in the fleet within the geographic region and typically closest to the service provider, is then assigned the task, and the provider of the service 204 then interacts with that robot 101 at their business (e.g., loading it with goods, if needed). The robot then travels to the customer 202 and the customer interacts with the robot to retrieve their goods or service (e.g., the goods ordered). An interaction can include requesting the robot to open its compartment 102, 104 through the customer's app or through a user interface on the robot itself (using, e.g., RFID reader and customer phone, a touchpad, a keypad, voice commands, vision-based recognition of the person, etc.). Upon completion of the delivery (or retrieval, if appropriate), the robot reports completion of the assignment and reports back to the fleet management module for re-assignment.

Figure 12:
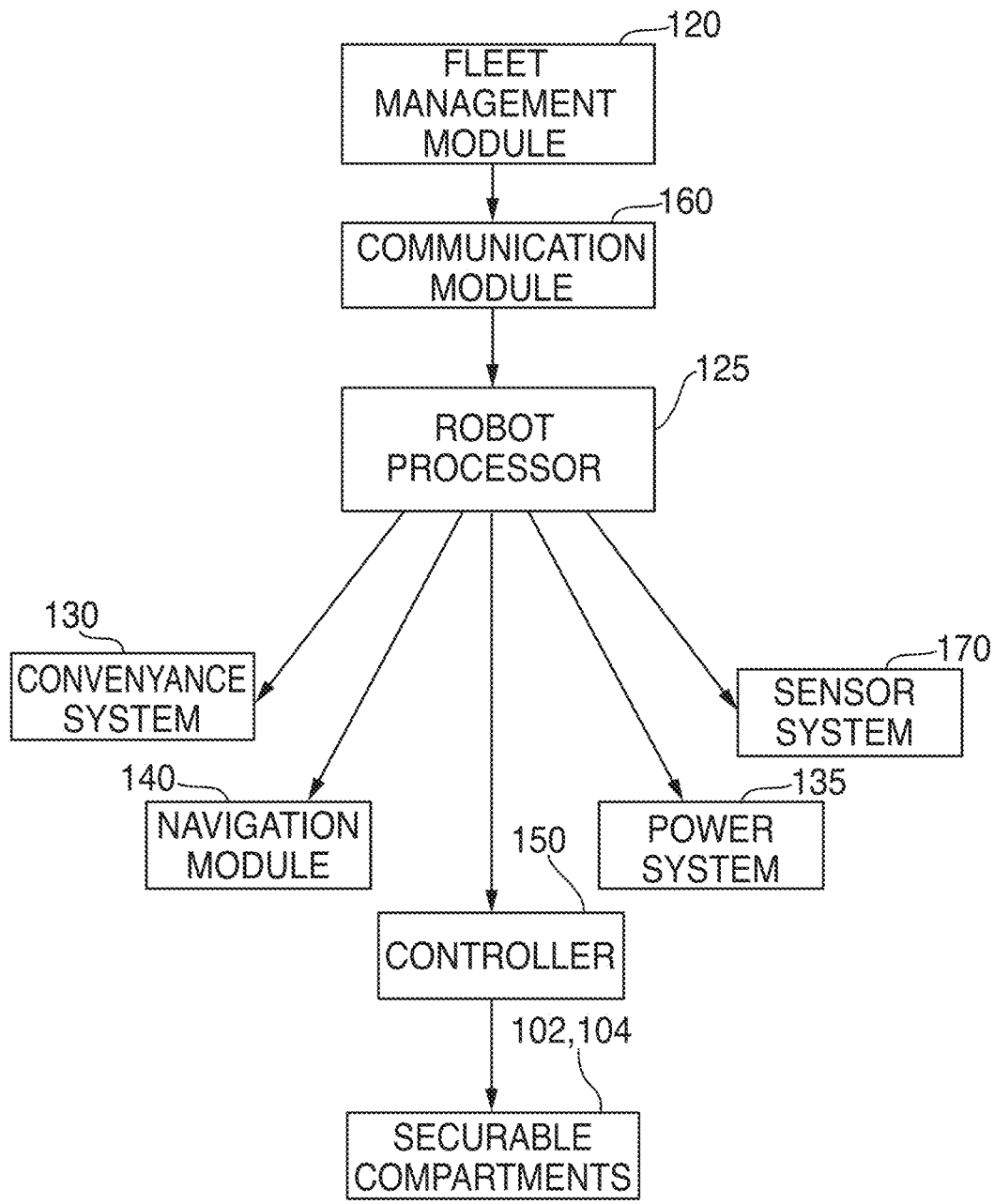
FIG. 12 is an exemplary flowchart representation of the logic flow from the Fleet Management Control Module through the robot processor to the various systems and modules of the robot.

As further illustrated in FIG. 12, and previously noted, in some embodiments, the fleet management module 120 handles coordination of the robot fleet 100 and assignment of tasks for each robot 101 in the fleet. The fleet management module coordinates the activity and positioning of each robot in the fleet. The fleet management module also communicates with vendors/businesses 204 and customers 202 to optimize behavior of entire system. It does this by utilizing the robot's processor 125 to process the various inputs and outputs from each of the robot's systems and modules, including: the conveyance system 130, the power system 135, the navigation module 140, the sensor system 170, 175, the communication module 160, and the controller 150, to effectively manage and coordinate the various functions of each robot in the fleet.

In some embodiments, the robot may be requested for a pick-up of an item (e.g., a document) with the intent of delivery to another party. In this scenario, the fleet management module would assign the robot to arrive at a given location, assign a securable compartment for receipt of the item, confirm receipt from the first party to the fleet management module, then proceed to the second location where an informed receiving party would recover the item from the robot using an appropriate PIN or other recognition code to gain access to the secure compartment. The robot would then reports completion of the assignment and report back to the fleet management module for re-assignment.

Conveyance Systems

Each robot vehicle 101 in the fleet includes a conveyance system 130 (e.g., a drive system with a propulsion engine, wheels, treads, wings, rotors, blowers, rockets, propellers, brakes, etc.).

As noted previously, the robot fleet is configurable for land, water or air. Typical vehicles include cars, wagons, vans, unmanned motor vehicles (e.g., tricycles, trucks, trailers, buses, etc.), unmanned railed vehicles (e.g., trains, trams, etc.), unmanned watercraft (e.g., ships, boats, ferries, landing craft, barges, rafts, etc.), aerial drones, unmanned hovercraft (air, land, and water types), unmanned aircraft, and unmanned spacecraft.

In one exemplary embodiment, a robot land vehicle 101 is configured with a traditional 4-wheeled automotive configuration comprising conventional steering and braking systems. The drive train is configurable for standard 2-wheel drive or 4-wheel all-terrain traction drive. The propulsion system (engine) is configurable as a gas engine, a turbine engine, an electric motor and/or a hybrid gas/electric engine. Alternatively, the robot could be configured with an auxiliary solar power system 135 to provide back-up emergency power or power for minor low-power sub-systems.

Alternative configurations of components to a total drive system with a propulsion engine could include wheels, treads, wings, rotors, blowers, rockets, propellers, brakes, etc.

In some embodiments, the robot fleet is configured for water travel as a watercraft with a propulsion system (engine) that is configurable as a gas engine, a turbine engine, an electric motor and/or a hybrid gas/electric engine and is further configured with a propeller.

In some embodiments, the robot fleet is configured for hover travel as an over-land or over-water hovercraft or an air-cushion vehicle (ACV) and is configured with blowers to produce a large volume of air below the hull that is slightly above atmospheric pressure. The propulsion system (engine) is configurable as a gas engine, a turbine engine, an electric motor and/or a hybrid gas/electric engine.

In some embodiments, the robot fleet is configured for air travel as an aerial drone or aerial hovercraft and is configured with wings, rotors, blowers, rockets, and/or propellers and an appropriate brake system. The propulsion system (engine) is configurable as a gas engine, a turbine engine, an electric motor and/or a hybrid gas/electric engine.

The Power System

In some embodiments, each robot of the robot fleet is configured with one or more power sources, which include the power system 135 (e.g., battery, solar, gasoline, propane, etc.).

Navigation Module

Each robot in the fleet further includes a navigation module 140 for navigation in the unstructured open or closed environments (e.g., digital maps, HD maps, GPS, etc.). In some embodiments, the fleet 100 relies on maps generated by the user, operator, or fleet operator, specifically created to cover the intended environment where the robot is configured to operate. These maps would then be used for general guidance of each robot in the fleet, which would augment this understanding of the environment by using a variety of on-board sensors such as cameras, LiDAR, altimeters or radar to confirm its relative geographic position and elevation.

In some embodiments, for navigation, the fleet of robots uses internal maps to provide information about where they are going and the structure of the road environment (e.g., lanes, etc.) and combine this information with onboard sensors (e.g., cameras, LiDAR, radar, ultrasound, microphones, etc.) and internal computer processing to constantly determine where they can safely navigate, what other objects are around each robot and what they may do. In still other embodiments, the fleet incorporates on-line maps to augment internal maps. This information is then combined to determine a safe, robust trajectory for the robot to follow and this is then executed by the low level actuators on the robot.

In some embodiments, the fleet relies on a global positioning system (GPS) that allows land, sea, and airborne users to determine their exact location, velocity, and time 24 hours a day, in all weather conditions, anywhere in the world.

In some embodiments, the fleet of robots will use a combination of internal maps, sensors and GPS systems to confirm its relative geographic position and elevation.

In some embodiments, the autonomous fleet is strategically positioned throughout a geographic region in anticipation of a known demand.

Over time, a user 200 and/or a vendor 204 can anticipate demand for robot services by storing data concerning how many orders (and what type of orders) are made at particular times of day from different areas of the region. This can be done for both source (e.g., restaurants, grocery stores, general businesses, etc.) and destination (e.g., customer, other businesses, etc.). Then, for a specific current day and time, this stored data is used to determine what the optimal location of the fleet is given the expected demand. More concretely, the fleet can be positioned to be as close as possible to the expected source locations, anticipating these source locations will be the most likely new orders to come into the system. Even more concretely, it is possible to estimate the number of orders from each possible source in the next hour and weight each source location by this number. Then one can position the fleet so that the fleet optimally covers the weighted locations based on these numbers.

In some embodiments of the robot fleet, the positioning of robots can be customized based on: anticipated use, a pattern of historical behaviors, or specific goods being carried.

Sensor Systems

As noted previously, each robot is equipped with a sensor system 170, which includes at least a minimum number of onboard sensors (e.g., cameras (for example, those running at a high frame rate akin to video), LiDAR, radar, ultrasonic sensors, microphones, etc.) and internal computer processing 125 to constantly determine where it can safely navigate, what other objects are around each robot, and what it may do within its immediate surroundings.

In some embodiments, the robots of the robot fleet further include conveyance system sensors 175 configured to: monitor drive mechanism performance (e.g., the propulsion engine); monitor power system levels 135 (e.g., battery, solar, gasoline, propane, etc.); or monitor drive train performance (e.g., transmission, tires, brakes, rotors, etc.).

Communications Module

Each robot in the fleet further includes a communication module 160 configurable to receive, store and send data to the fleet management module, to a user, to and from the fleet management module 120, and to and from the robots in the fleet 100. In some embodiments, the data is related to at least user interactions and the robot fleet interactions, including, for example, scheduled requests or orders, on-demand requests or orders, or a need for self-positioning of the robot fleet based on anticipated demand within the unstructured open or closed environments.

In some embodiments, each robot in the fleet includes at least one communication module configurable to receive, store and transmit data, and to store that data to a memory device, for future data transfer or manual download.

In some embodiments, each business 204 and customer 202 has their own app/interface to communicate with the fleet operator 200 (e.g., "Nuro customer app" for customers on their phone, "Nuro vendor app" for businesses on a tablet or phone or their internal computer system, etc.).

In some embodiments, the communication to the user and the robots in the fleet, between the robots of the fleet, and between the user and the robots in the fleet, occurs via wireless transmission.

In some embodiments, the user's wireless transmission interactions and the robot fleet wireless transmission interactions occur via mobile application transmitted by an electronic device and forwarded to the communication module via: a central server, a fleet management module, and/or a mesh network.

In some embodiments, one preferred method of communication is to use cellular communication between the fleet manager and fleet of robots, (e.g., 3G, 4G, 5G, or the like). Alternatively, the communication between the fleet control module and the robots could occur via satellite communication systems.

In some embodiments, a customer uses an app (either on a cellphone, laptop, tablet, computer or any interactive device) to request a service (e.g., an on-demand food order or for a mobile marketplace robot to come to them).

In some embodiments, the electronic device includes: a phone, a personal mobile device, a personal digital assistant (PDA), a mainframe computer, a desktop computer, a laptop computer, a tablet computer, and/or wearable computing device such as a communication headset, smart glasses, a contact lens or lenses, a digital watch, a bracelet, a ring, jewelry, or a combination thereof.

Goods and Services

In some embodiments, the user includes a fleet manager, a sub-contracting vendor, a service provider, a customer, a business entity, an individual, or a third party.

In some embodiments, the services include: subscription services, prescription services, marketing services, advertising services, notification services, or requested, ordered or scheduled delivery services. In particular embodiments, the scheduled delivery services include, by way of example, special repeat deliveries such as groceries, prescriptions, drinks, mail, documents, etc.

In some embodiments, the services further include: the user receiving and returning the same or similar goods within the same interaction (e.g., signed documents), the user receiving one set of goods and returning a different set of goods within the same interaction, (e.g., product replacement/returns, groceries, merchandise, books, recording, videos, movies, payment transactions, etc.), a third party user providing instruction and or authorization to a goods or service provider to prepare, transport, deliver and/or retrieve goods to a principle user in a different location.

In some embodiments, the services further include: advertising services, land survey services, patrol services, monitoring services, traffic survey services, signage and signal survey services, architectural building or road infrastructure survey services.

In some embodiments, at least one robot is further configured to process or manufacture goods.

In some embodiments, the processed or manufactured goods include: beverages, with or without condiments (such as coffee, tea, carbonated drinks, etc.); various fast foods; or microwavable foods.

In some embodiments, the robots within the fleet are equipped for financial transactions. These can be accomplished using known transaction methods such as debit/credit card readers or the like.

Securable Compartments

Figure 2:
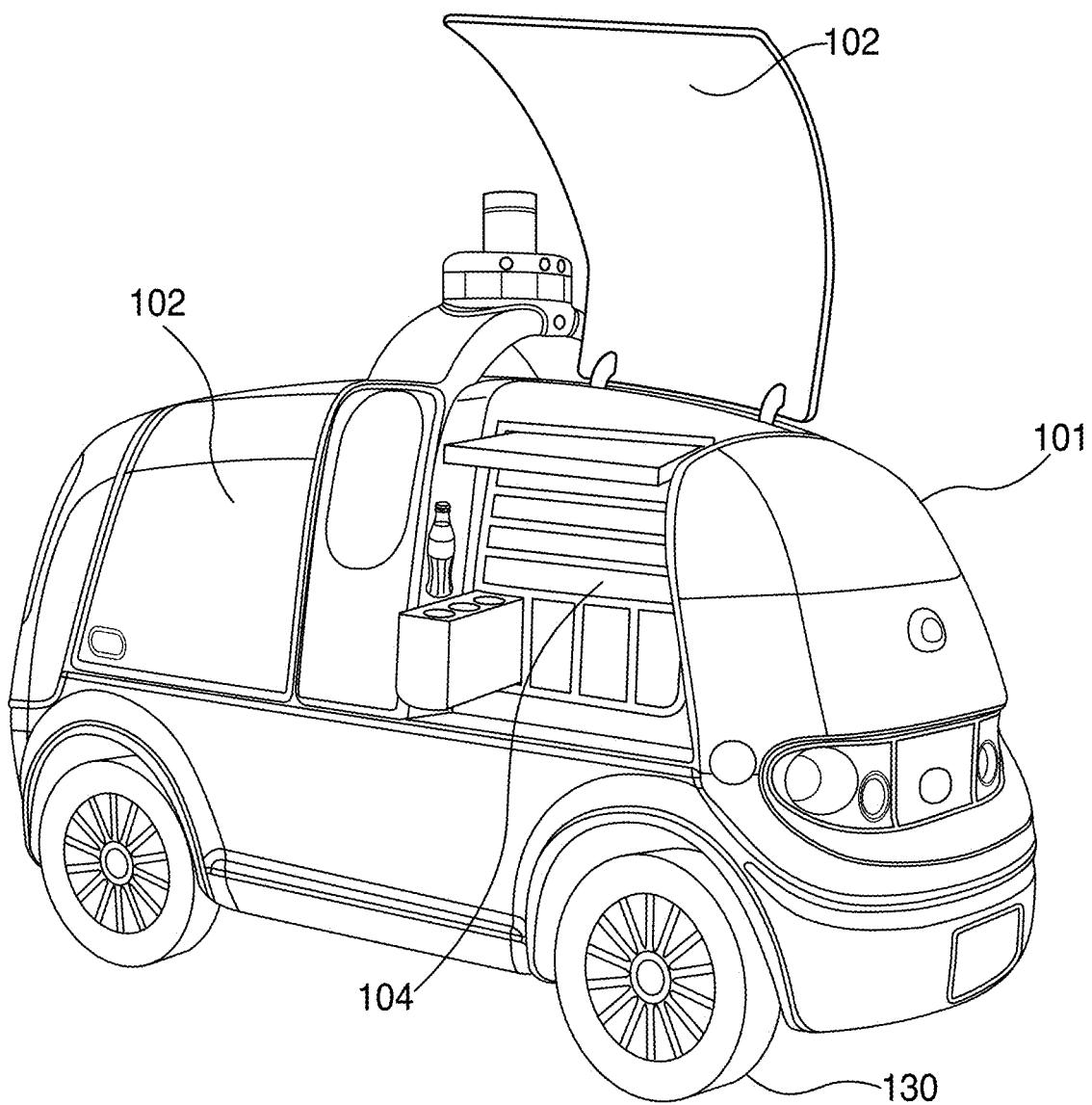
FIG. 2 is an exemplary ISO view of a robot vehicle, part of an autonomous robot fleet, illustrating securable compartments within the vehicle.
Figure 3:
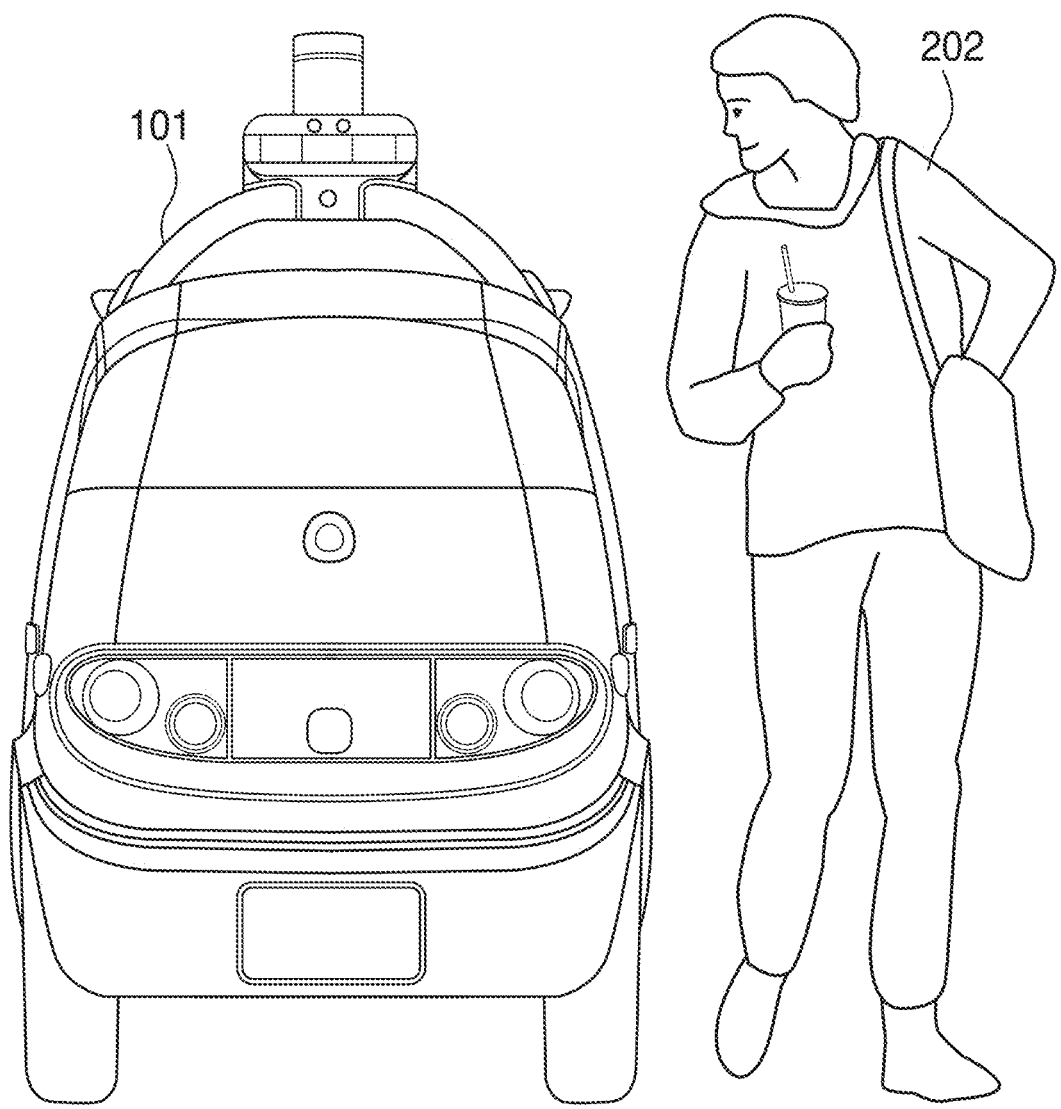
FIG. 3 is an exemplary front view of a robot vehicle, part of an autonomous robot fleet, shown in comparison to the height of an average person.
Figure 4:
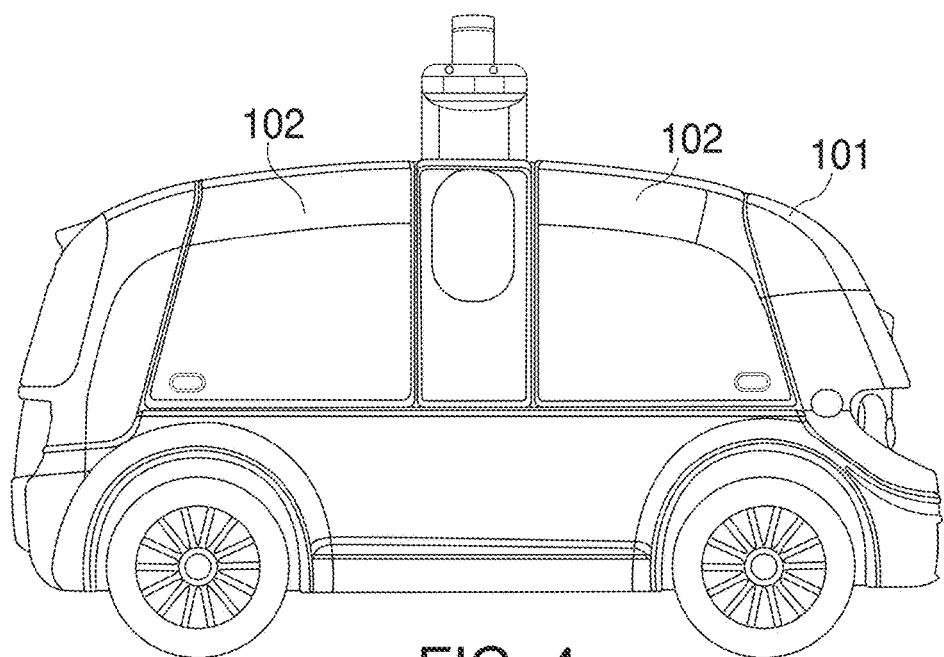
FIG. 4 is an exemplary right side view of a robot vehicle, part of an autonomous robot fleet, illustrating a configuration with two large side doors, each enclosing securable compartments.
Figure 5:
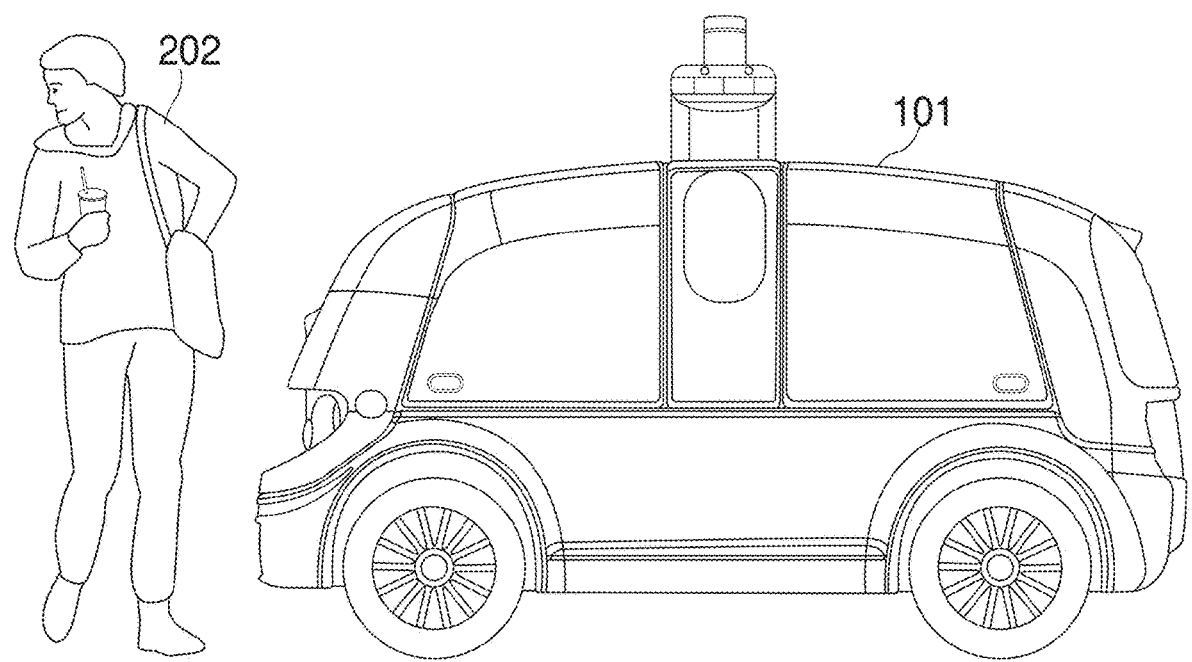
FIG. 5 is an exemplary left side view of a robot vehicle, part of an autonomous robot fleet, shown in comparison to the height of an average person.
Figure 6:
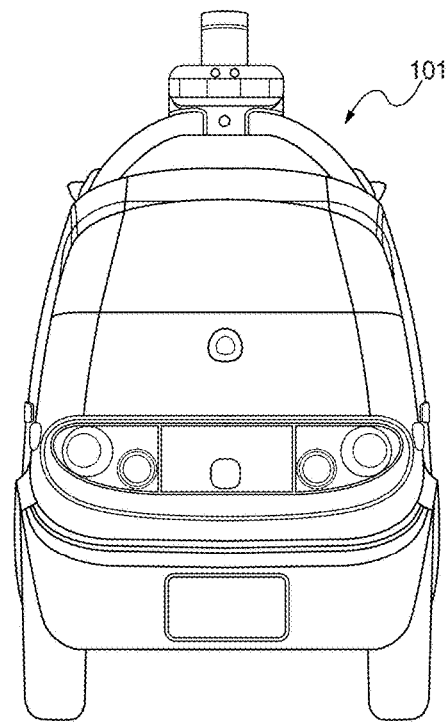
FIG. 6 is an exemplary rear view of a robot vehicle, part of an autonomous robot fleet.
Figure 7:
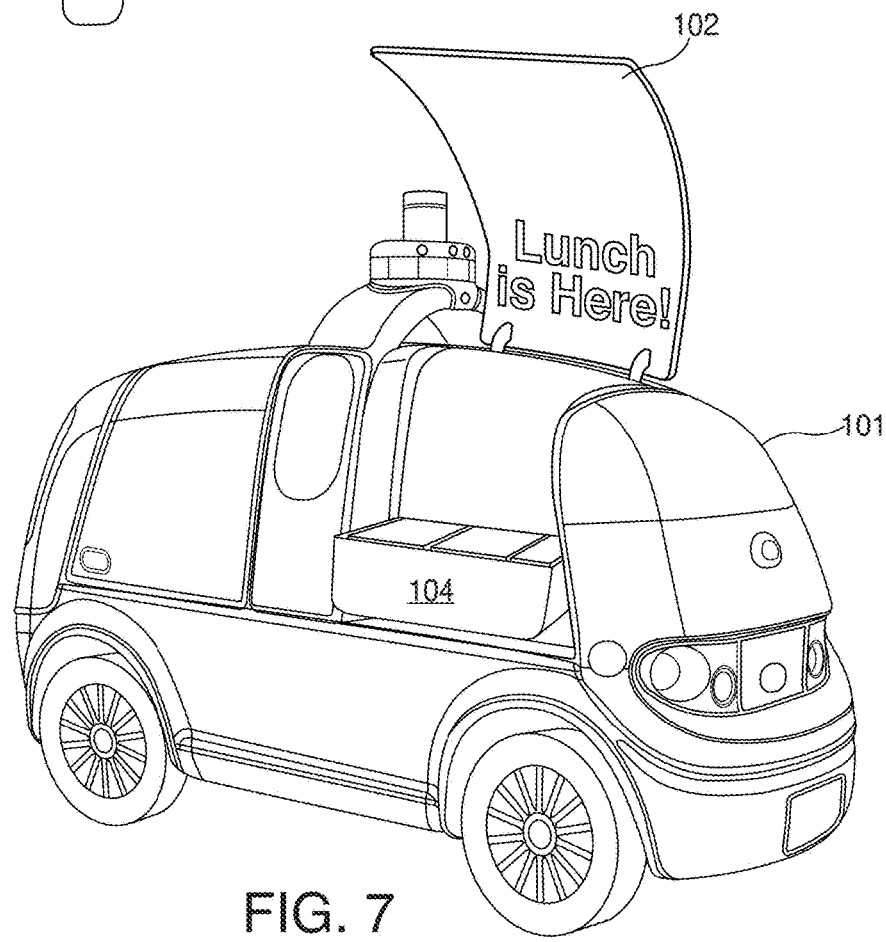
FIG. 7 is an exemplary ISO view of a robot vehicle, part of an autonomous robot fleet, illustrating an autonomous lunch delivery vehicle for any branded company.

As illustrated in FIG. 2, robots in the fleet are each configured for transporting, delivering or retrieving goods or services and are capable of operating in an unstructured open environment or closed environment. In some embodiments, the vehicle 101 is configured to travel practically anywhere that a small all-terrain vehicle could travel on land, while providing at least one and preferably two large storage compartments 102, and more preferably, at least one large compartment 102 is configured with smaller internal secure compartments 104 of variable configurations to carry individual items that are to be delivered to, or need to be retrieved from customers.

Alternately, in some embodiments, the vehicle could be configured for water travel, providing at least one and preferably two large storage compartments, and more preferably, at least one large compartment is configured with smaller internal secure compartments of variable configurations to carry individual items that are to be delivered to, or need to be retrieved from customers.

Further still, in some embodiments, the vehicle could be configured for hover travel, providing at least one and preferably two large storage compartments, and more preferably, at least one large compartment is configured with smaller internal secure compartments of variable configurations to carry individual items that are to be delivered to, or need to be retrieved from customers.

Further still, in some embodiments, the vehicle could be configured for aerial drone or aerial hover travel, providing at least one and preferably two large storage compartments, and more preferably, at least one large compartment is configured with smaller internal secure compartments of variable configurations to carry individual items that are to be delivered to, or need to be retrieved from customers.

Figure 8:
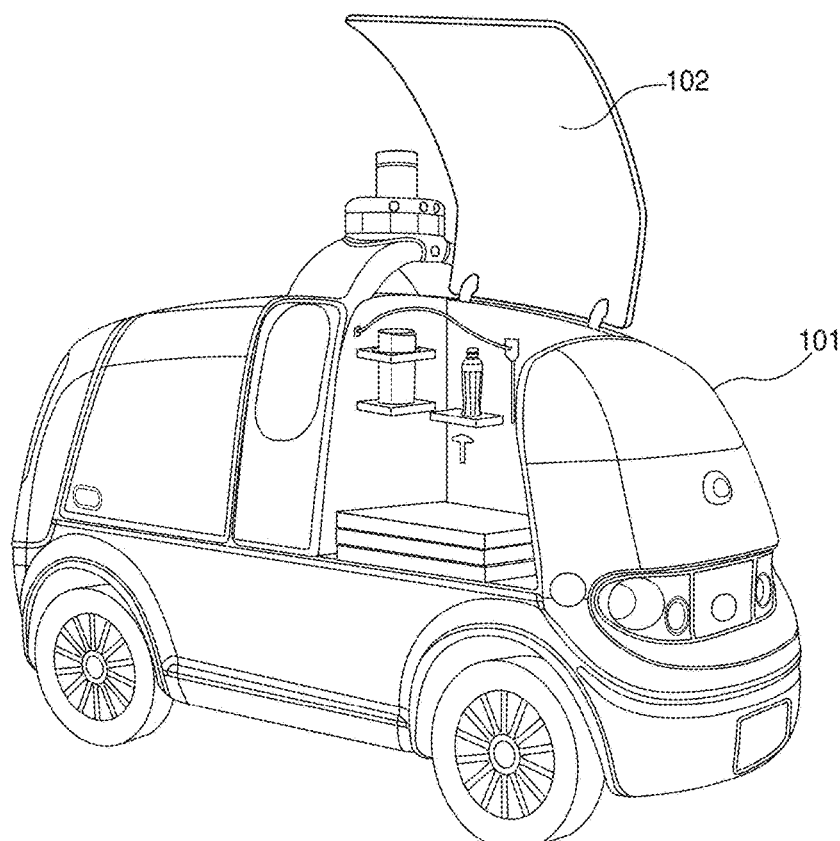
FIG. 8 is an exemplary ISO view of a robot vehicle, part of an autonomous robot fleet, illustrating an autonomous pizza delivery vehicle for any branded company.
Figure 9:
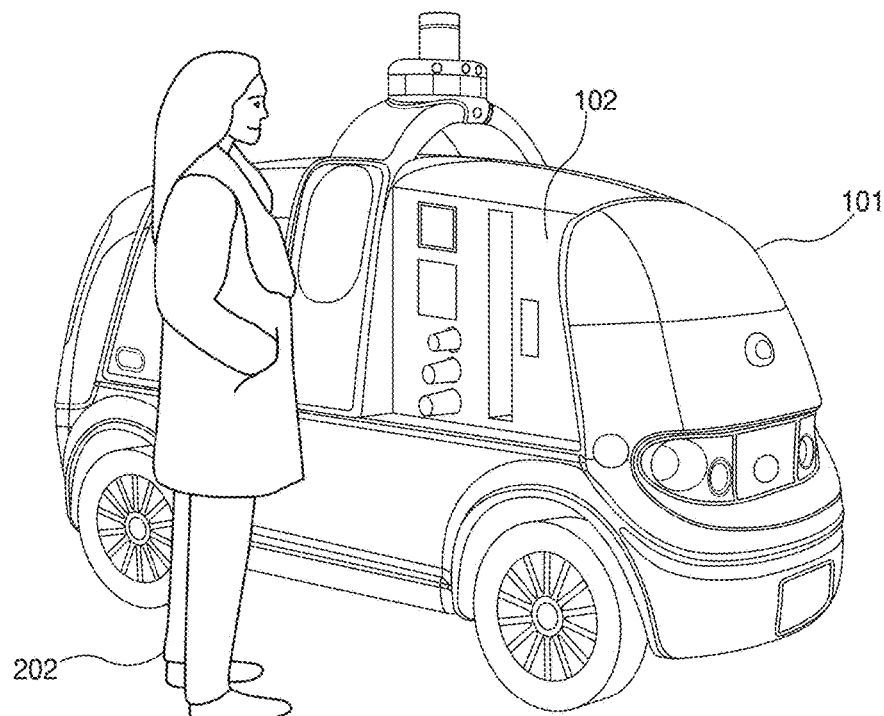
FIG. 9 is an exemplary ISO view of a robot vehicle, part of an autonomous robot fleet, illustrating an autonomous coffee delivery vehicle for any branded company.
Figure 10:
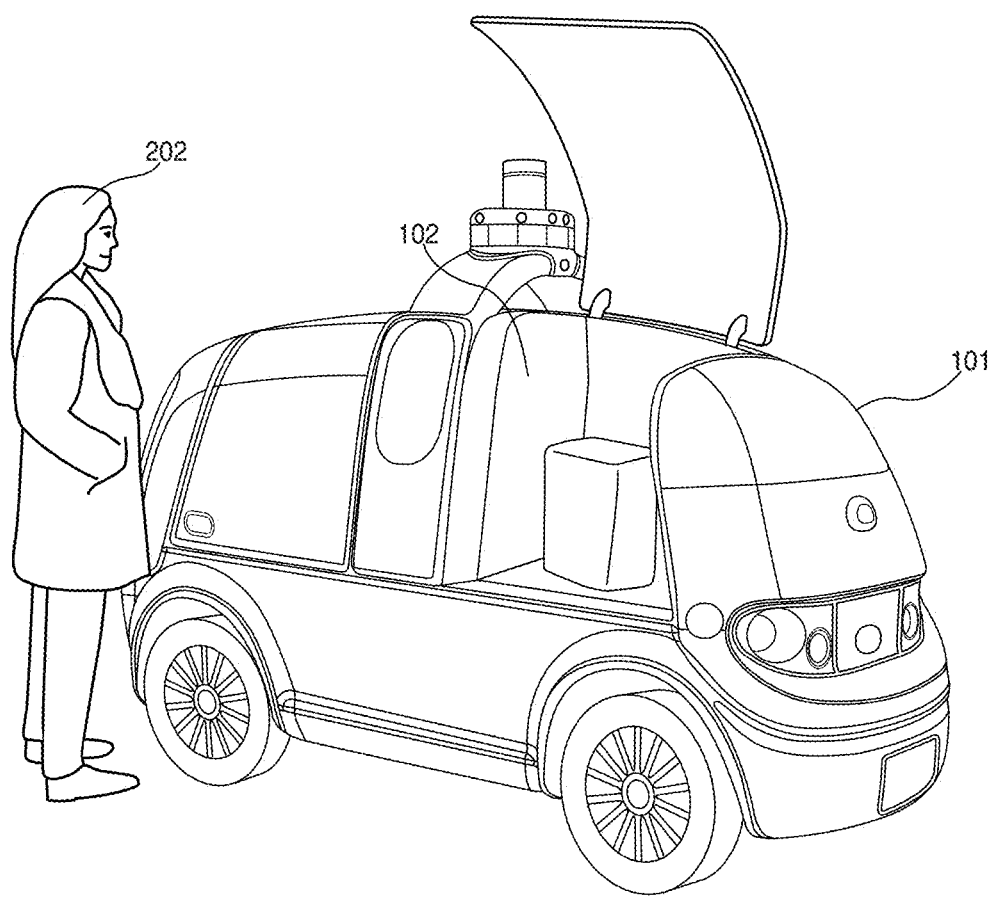
FIG. 10 is an exemplary ISO view of a robot vehicle, part of an autonomous robot fleet, illustrating an autonomous evening/nighttime delivery vehicle for any branded company, comprising a lighted interior.

As illustrated in FIGS. 7-10, in some embodiments, the securable compartments are humidity and temperature controlled for, for example, hot goods, cold goods, wet goods, dry goods, or combinations or variants thereof. Further still, as illustrated in FIGS. 8-10, the compartment(s) are configurable with various amenities, such as compartment lighting for night deliveries and condiment dispensers.

In some embodiments, the securable compartments are configurable for various goods. Such configurations and goods include: bookshelves for books, thin drawers for documents, larger box-like drawers for packages, and sized compartments for vending machines, coffee makers, pizza ovens and dispensers.

In some embodiments, the securable compartments are variably configurable based on: anticipated demands, patterns of behaviors, area of service, or types of goods to be transported.

Further still, each robot includes securable compartments to hold said goods or items associated with said services, and a controller 150 configurable to associate each one of the securable compartments 102, 104 to an assignable customer 202 or provider 204 and provide entry when authorized, Each robot vehicle further includes at least one processor configured to manage the conveyance system, the navigation module, the sensor system, instructions from the fleet management module, the communication module, and the controller.

As described previously, each robot is configured with securable compartments. Alternately, a robot is configurable to contain a set of goods or even a mobile marketplace (similar to a mini bar at a hotel).

When a robot is assigned to a customer 202, one or more of the compartments 102, 104 is also assigned to that customer. Each of the large compartments 12 is secured separately and can securely transport goods to a separate set of customers 202.

Upon arrival of the robot to the customer destination, the customer can then open their respective compartment(s) by verifying their identity with the robot. This can be done through a wide variety of approaches comprising, but not limited to:

1. The customer can be given a PIN (e.g., 4 digit number) when they make their initial request/order. They can then enter this pin at the robot using the robot touchscreen or a keypad.
2. The customer can verify themselves using their mobile phone and an RFID reader on the robot.
3. The customer can verify themselves using their voice and a personal keyword or key phrase they speak to the robot.
4. The customer can verify themselves through their face, a government ID, or a business ID badge using cameras and facial recognition or magnetic readers on the robot.
5. The customer can verify themselves using their mobile phone; by pushing a button or predetermined code on their phone (and the system could optionally detect the customer is near the robot by using their GPS position from phone)

Figure 13:
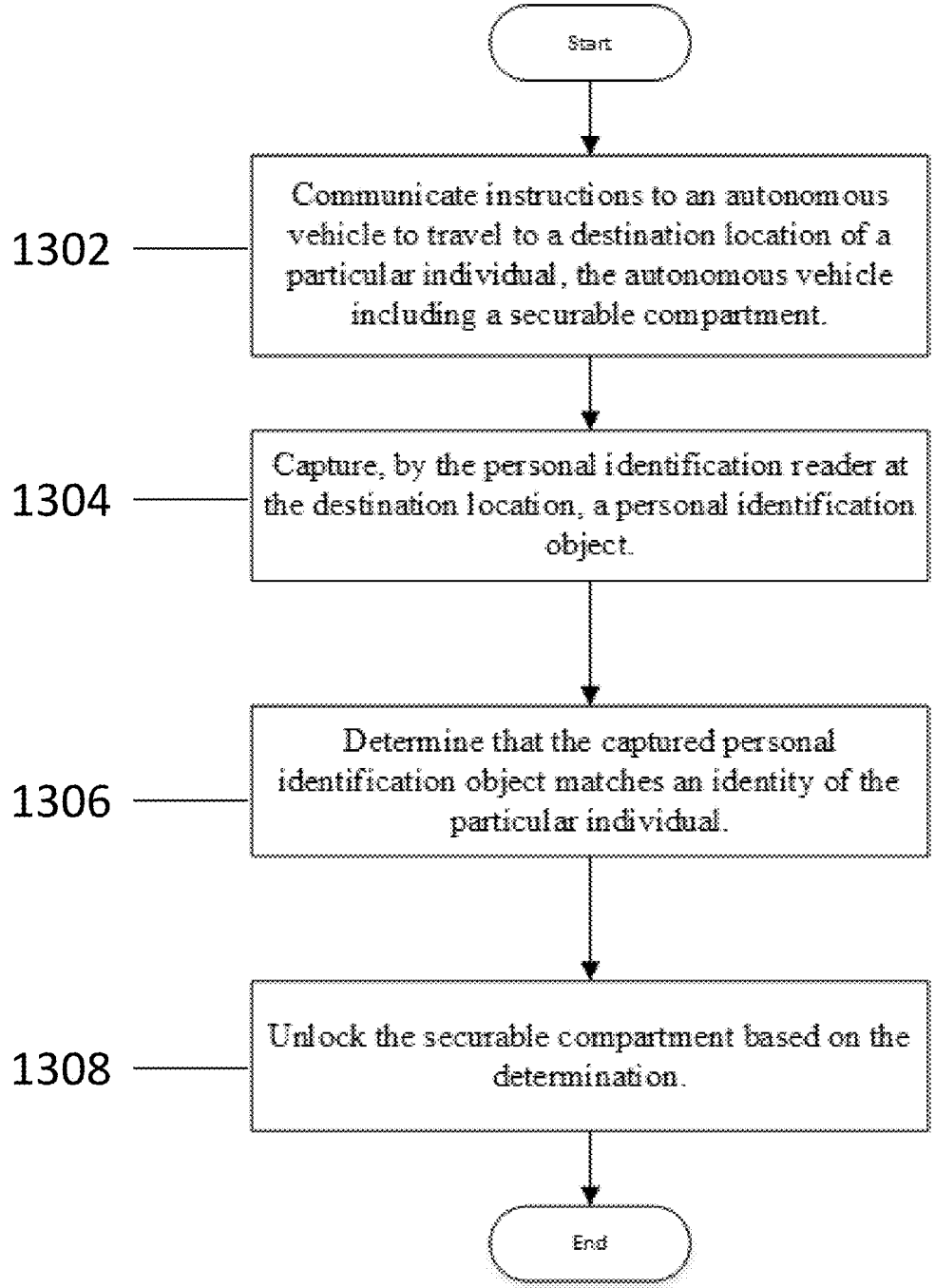
FIG. 13 is an exemplary flowchart representation illustrative of a high level method for providing ID verification via an autonomous vehicle.

Referring now to FIG. 13, there is shown a flow diagram of a method 1300 for providing personal verification or age verification via an autonomous vehicle. Persons skilled in the art will appreciate that one or more operations of the method 1300 may be performed in a different order, repeated, and/or omitted without departing from the scope of the present disclosure. In various embodiments, the illustrated method 1300 can operate in the central server 110 of FIG. 11, in the fleet management module 120, or in another server or system. In various embodiments, some or all of the operations in the illustrated method 1300 can operate in the robot vehicle 101, such as using the components of FIG. 12. Other variations are contemplated to be within the scope of the present disclosure. The operations of FIG. 13 will be described with respect to a server system, but it will be understood that the illustrated operations are applicable to other systems as well.

Initially at step 1302, the server system communicates instructions to an autonomous robot vehicle 101 to travel to a destination location of a particular individual. Aspects of the autonomous robot vehicle are described above herein, including aspects relating to navigation and autonomous travel. The autonomous vehicle includes one or more securable compartments. The securable compartment contains an item for delivery to the particular individual. In various embodiments, the item may be a prescription drug. In various embodiments, the item may be another item that requires identity or age verification, such as liquor or over the counter medication, among other things. In various embodiments, the particular individual may be a patient. For example, the server system may instruct an autonomous robot vehicle 101 to travel to the house of a patient who has a prescription for a medication. It is contemplated that multiple items for multiple destinations may be stored in the secured compartment(s) 102, 104.

In various embodiments, a seller who provides the prescription items or other items may store the items in a compartment 102, 104 of the robot vehicle 101 prior to the order or after the order has been placed. In various embodiments, the robot vehicle 101 can receive the item in a sub-compartment. In various embodiments, the robot vehicle 101 can determine which compartment or sub-compartment 102, 104 to assign to a particular item based on the seller's description of the item, which may include dimension information and/or weight information.

At step 1304, the autonomous vehicle uses a personal identification reader at the destination location to capture a personal identification object. In various embodiments, and with reference also to FIG. 14, the personal identification reader may include a face-capturing device 1402 and/or an ID-card capturing device 1404. In various embodiments, the face-capturing device 1402 may be a camera. In various embodiments, the ID-card capturing device 1404 may be a camera, a magnetic strip reader, or a barcode scanner, among other things. In various embodiments, the personal identification object may be a face of a person or may be a government-issued photo ID card. In various embodiments, the personal identification reader may include a fingerprint scanner and the personal identification object may include a fingerprint. For example, the fingerprint scanner may be used to verify the identity of a person, based on the person placing a finger on the fingerprint scanner. Fingerprint data may be stored remotely for matching to the scanned fingerprint. It is contemplated that other forms of identification may be used.

In various embodiments, if the personal identification object is a government-issued photo ID card, the identity of the individual can be verified by confirming the validity of the ID card with a government authority, and comparing the information in the ID card with previously stored information. In various embodiments, the name in the ID card can be compared to a name associated with an order or a prescription. In various embodiments, other information in the ID card can be compared to previously stored information, such as a birthday, a street address, or an ID card number. In various embodiments, the birthday information in the ID card can be used to verify an age of the recipient.

In various embodiments, in the case the personal identification object is a face, the autonomous robot vehicle 101 may verify whether the face is a live face or is a photograph of a face. For example, the autonomous robot vehicle 101 is able to detect if someone is using a picture of the intended recipient based on LiDAR or radar technology, which provide depth perception. The autonomous vehicle 101 can include LiDAR and/or radar emitters and sensors to scan a face to obtain depth information. If the LiDAR and/or radar data shows depth for the face, then the face can be determined to be a live face and not a photograph of a face.

In various embodiments, the autonomous robot vehicle 101 can use parallax effects to determine whether a face is a live face or a photograph of a face. Parallax effect refers to taking images of an object at different angles, and determining the differences (if any) in the resulting images. In accordance with aspects of the present disclosure, the autonomous robot vehicle 101 can include a second camera that captures the face from a different angle. In various embodiments, the autonomous robot vehicle can use a movable camera to capture the face from different angles. The resulting images can be compared to determine whether they reflect a parallax effect, thereby determining whether the face is a live face or a photograph of a face.

In various embodiments, the autonomous robot vehicle 101 can capture facial movements to determine whether the face is a live face or a photograph of a face. For example, the autonomous robot vehicle may instruct the individual to blink their eyes, move their mouth, or perform some other facial movement. The autonomous robot vehicle can capture the performed action and thereby verify whether the face is a live face. The facial movements described above are exemplary, and other facial movements are contemplated, such as opening and closing of the mouth.

At step 1306, the server system or the autonomous robot vehicle determines whether the captured personal identification object matches an identity of the particular individual. In various embodiments, identity information for the particular individual may be saved from past interactions with the particular individual or may be previously stored. The server system or the autonomous robot vehicle may compare the captured personal identification object with the previously stored information. If the server system performs the comparison, the autonomous robot vehicle can communicate the captured personal identification object to the server system, which can then compare the captured personal identification object to the identity information. If the autonomous robot vehicle performs the comparison, the server system can communicate the previously stored identity information to the autonomous robot vehicle, which can then compare the captured personal identification object to the identity information.

In various embodiments, a combination of identification card and/or face match may be used to confirm identity. In various embodiments, facial recognition technology can be used to determine that a captured face matches an identity of the particular individual. For example, previous images of the individual's face can be stored on file. Using facial recognition technology, the stored face images can be compared to the captured face to determine whether they match each other.

In various embodiments, a remote human operator can check the identity in real time. For example, the captured personal identification object can be communicated to a remote human operator at an off-site location. The remote human operator can compare the captured personal identification object to previously stored information to verify the identity of the individual. For example, the remote human operator can compare a captured face to previously stored facial images. As another example, the remote human operator can compare a captured identification card to previously stored identity information.

In accordance with aspects of the present disclosure, the identity verification methods described above can be supplemented by additional verification. In various embodiments, in the case of prescription medication, the server system and/or the autonomous robot vehicle can request the recipient to answer questions or enter information regarding the prescribing physician, a pharmacist, the medication, and/or the patient's medical history. In various embodiments, the server system and/or the autonomous robot vehicle can request the recipient to answer other questions about the items, such as having the recipient name the item, the number of items, and/or the cost of the items, among other things.

At step 1310, the autonomous robot vehicle unlocks the compartment 102, 104 based on the determination that there is a match. Once the system decides there is a match, and the system unlocks the compartment 102, 104, then the recipient can retrieve their items from the autonomous robot vehicle 101. If it is determined that there is not a match, the autonomous vehicle 101 would not unlock and would not permit access to the items in its compartment.

The examples of identity or age verification described above herein are merely illustrative, and other verification or identification approaches are contemplated to be within the scope of the present disclosure. For example, in various embodiments, an autonomous robot vehicle can capture images of an individual's face as well as an individual's government-issued photo ID card. The photo in the ID card can be compared to the captured face of the individual to determine whether they match. If the captured face matches the face in the photo ID card, and the ID card information matches information about the intended recipient, the identity of the recipient can then be verified.

Figure 14:
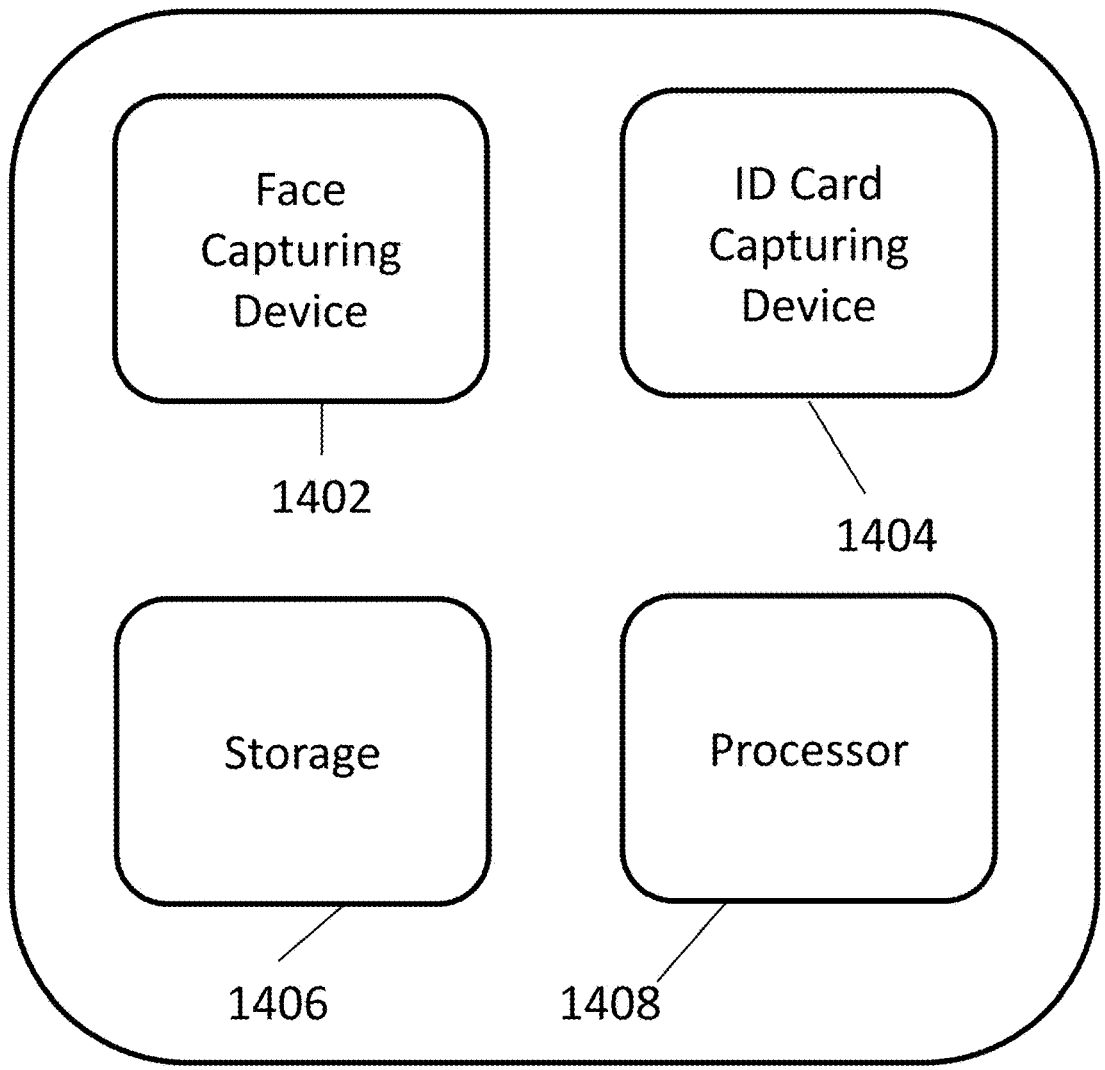
FIG. 14 is an exemplary block diagram representation illustrative of various modules.

Referring to FIG. 14, there is shown a block diagram of exemplary components for verifying an identity or age of a recipient. The face capturing device 1402 and the ID card capturing device 1404 are described above herein. The storage 1406 can store any of the information described above herein needed to perform an identity or age verification. The processor 1408 can execute instructions for controlling and/or performing any of the operations described above herein for performing identity or age verification.

Figure 15:
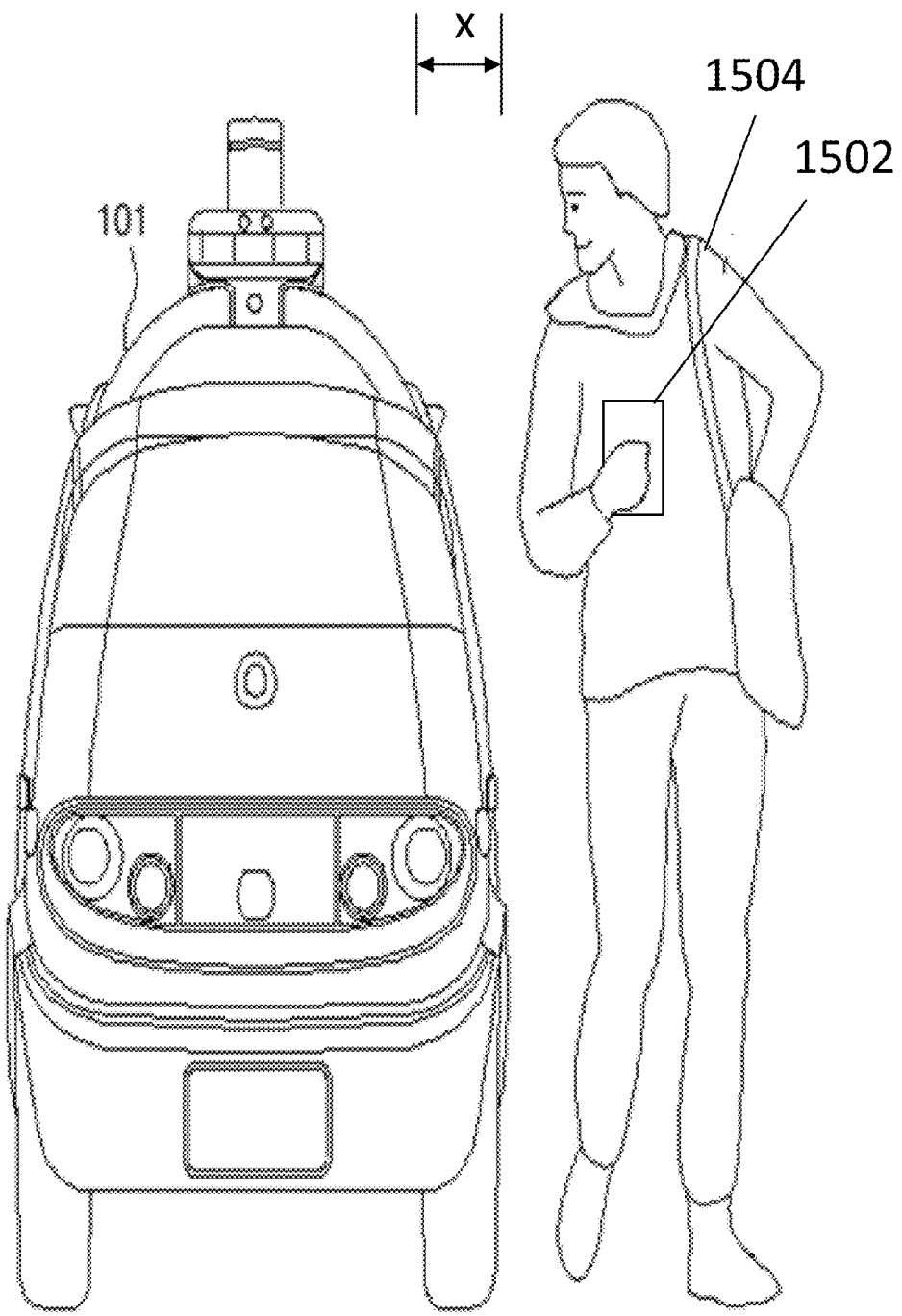
FIG. 15 is an exemplary front view of a robot vehicle, part of an autonomous robot fleet, shown next to a person holding a user device.

FIG. 15 shows a diagram of another way of verifying the identity or age of a recipient. FIG. 15 shows an exemplary front view of a robot vehicle 101, and an individual 1504 standing next to the robot vehicle and holding a user device 1502. As described above herein, the autonomous robot vehicle 101 travels to a destination location of the particular individual 1504. The autonomous vehicle 101 includes a securable compartment configured to autonomously lock and unlock, and the securable compartment contains an item to be delivered to the particular individual 1504. In accordance with aspects of the present disclosure, the autonomous robot vehicle 101 communicates its location to the server system.

In FIG. 15, the user device 1502 may be a cell phone, a tablet, a laptop, or other mobile device. In various embodiments, the user device 1502 includes a camera. In various embodiments, the user device 1502 includes GPS enabled location services. The user device 1502 can communicate with a system for confirming the identity of the individual 1504, such as a server system as described in connection with FIG. 13. For example, the user device 1502 can include an app or other interface for communicating with the server system. The app or interface can transmit the location of the user device 1502 to the autonomous vehicle 101 or to the server system.

The app or interface may authenticate the user device 1502 to the server system. For example, the user device 1502 may capture the face or photo ID card of the individual 1504 and transmit the captured information to the server system. In various embodiments, the app of the user device 1502 may already be registered with the server system, such that a user login password can be used to authenticate the user device 1502 with the server system.

As described above, the user device 1502 also communicates its GPS location to the server system or the autonomous vehicle 101. In accordance with aspects of the present disclosure, the user device 1502 is authenticated and is sufficiently near the autonomous vehicle 101, this combination of conditions can verify the identity of the individual 1504. For example, the user device 1502 may be sufficiently near the autonomous vehicle 101 if its GPS location is within a predetermined distance (X) of the GPS location of the autonomous vehicle 101. In various embodiments, the predetermined distance X may be several inches or several feet from the autonomous vehicle 101. If the user device 1502 is authenticated and is within the predetermined distance X of the autonomous vehicle 101, then the identity of the individual 1504 can be confirmed, and the autonomous vehicle 101 can unlock the securable compartment. It is contemplated that confirmation of the identity may occur at the autonomous vehicle 101 or at a server system.

Controller(s) and Processor(s)

In some embodiments, each robot in the robot fleet is equipped with one or more processors 125 capable of both high-level computing for processing as well as low-level safety-critical computing capacity for controlling the hardware. The at least one processor is configured to manage the conveyance system, the navigation module, the sensor system, instructions from the fleet management module, the communication module and the controller.

Further still, in some embodiments, each robot in the robot fleet is equipped with a controller 150 configurable to associate each one of the securable compartments 102, 104 to an assignable customer 202 or provider 204 and provide entry when authorized.

Additional Features

In some embodiments, the robot fleet further includes at least one robot having a digital display for curated content comprising: advertisements (i.e., for both specific user and general public), including services provided, marketing/promotion, regional/location of areas served, customer details, local environment, lost, sought or detected people, public service announcements, date, time, or weather.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, Python, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

The systems described herein may also utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. An autonomous robot vehicle comprising:
   a conveyance system;
   a plurality of securable compartments that are each configured to autonomously lock and unlock, a first of the securable compartments configured to contain a first item for delivery to a first individual, a second of the securable compartments configured to contain a second item for delivery to a second individual;
   a personal identification reader that includes a camera positioned on the autonomous robot vehicle to capture at least one image of a live face of the first individual;
   at least one processor; and
   a memory storing instructions which, when executed by the at least one processor, cause the autonomous robot vehicle to, autonomously:
      travel to a destination location of the first individual;
      capture, by the camera, at the destination location, a government-issued photo identification card of the first individual and the at least one image of the live face of the first individual;
      determine that the government-issued photo identification card matches an identity of the first individual by comparing the at least one image of the live face with a face pictured on the government-issued photo identification card;
      verify an age of the first individual, when the first item requires age verification for a distribution, by using birthday information obtained from the government-issued photo identification card that is determined to match the identity of the first individual; and
      unlock the first of the securable compartments, but not the second of the securable compartments, to provide access to the first item to the first individual, in response to verifying the identity and the age of the first individual.

2. The autonomous robot vehicle of claim 1, wherein the instructions, when executed by the at least one processor, further cause the autonomous robot vehicle to determine that information in the government-issued photo identification card matches previously stored data of the first individual.

3. The autonomous robot vehicle of claim 1, further comprising a fingerprint scanner configured to scan a fingerprint of the first individual for an additional identity verification.

4. The autonomous robot vehicle of claim 1, wherein the instructions, when executed by the at least one processor, further cause the autonomous robot vehicle to:
transmit the at least one image of the live face captured by the camera to a remote human operator; and
receive an indication, from the remote human operator, that the live face matches the identity of the first individual.

5. The autonomous robot vehicle of claim 1, further comprising:
a sensor system using at least one of LiDAR or RADAR, wherein the instructions, when executed by the at least one processor, further cause the autonomous robot vehicle to:
capture the live face, by the sensor system at the destination location, to provide sensor face data; and
determine that the live face is a three-dimensional face based on the sensor face data.

6. The autonomous robot vehicle of claim 1, wherein the instructions, when executed by the at least one processor, further cause the autonomous robot vehicle to:
capture, by the camera at the destination location, the live face at a different angle; and
determine that the live face is a three-dimensional face based on parallax effects of the live face, wherein the parallax effects are based on the live face captured by the camera and the live face captured by the camera at the different angle.

7. The autonomous robot vehicle of claim 1, wherein the instructions, when executed by the at least one processor, further cause the autonomous robot vehicle to:
request a facial movement;
capture the facial movement; and
determine that the at least one image is of the live face based on the captured facial movement.

8. The autonomous robot vehicle of claim 1, wherein the first item for delivery to the first individual is a prescription drug for an individual named in a prescription, and
wherein the instructions, when executed by the at least one processor, cause the autonomous robot vehicle to determine that the government-issued photo identification card matches the identity of the individual named in the prescription that is stored in the memory.

9. The autonomous robot vehicle of claim 8, wherein the instructions, when executed by the at least one processor, further cause the autonomous robot vehicle to obtain additional verification by requesting, at the destination location, responses from the first individual to prompts for information regarding at least two of: a prescribing physician, a pharmacist, a medication, or a medical history and unlocking the first of the securable compartments when user input that includes the responses matches information stored in the memory.

10. The autonomous robot vehicle of claim 1, wherein the instructions cause the autonomous robot vehicle to confirm validity of the government-issued photo identification card by communicating with a government authority or a remote entity.

11. The autonomous robot vehicle of claim 1, wherein determining the identity of the first individual and verifying the age is performed by the processor of the autonomous vehicle such that the identity is verified using the government-issued photo identification card and the at least one image of the live face of the first individual and the age is verified using the government-issued photo identification card.

12. The autonomous robot vehicle of claim 1, further comprising:
a digital display configured to output curated content to the first individual, wherein the curated content comprises at least one advertisement specific to the first individual.

13. The autonomous robot vehicle of claim 1, wherein the instructions further cause the processor to unlock the first of the securable compartments, but not the second of the securable compartments, in response to verifying the identity and the age of the first individual and in response to receiving a recognition code that matches an assigned authorization code.

14. The autonomous robot vehicle of claim 1, further comprising:
an identity card capturing device that includes at least a second camera configured to capture the government-issued photo identification card of the first individual,
wherein at least one of the plurality of securable compartments includes a sub-compartment to receive the first item for delivery to the first individual.

15. A system for personal verification for autonomous robot vehicles having securable compartments configured to autonomously lock and unlock, the system comprising:
at least one processor; and
a memory storing instructions which, when executed by the at least one processor, cause the system to:
communicate instructions to an autonomous robot vehicle to travel to a destination location of a first individual, a first of the securable compartments of the autonomous robot vehicle configured to contain an item for delivery to the first individual while a second of the securable compartments configured to contain an item for delivery to a second individual;
receive an indication, from the autonomous robot vehicle, of a first location of the autonomous robot vehicle;
receive, from a mobile user device of the first individual, a second location of the mobile user device captured by a GPS of the mobile user device, and a government-issued photo identification card of the first individual; and at least one image of a live face of the first individual, captured by a camera of the mobile user device;
determine that (a) the second location of the mobile user device is within a predetermined distance from the first location of the autonomous robot vehicle;
based on the mobile user device being within the predetermined distance of the autonomous robot vehicle, determine that: (b) the government-issued photo identification card matches an identity of the first individual by comparing at least one image of the live face captured when the mobile user device is within the predetermined distance of the autonomous robot vehicle with a face pictured on the government-issued photo identification card, and (c) verify an age of the first individual, when the first item requires age verification for a distribution, by using birthday information obtained from the government-issued photo identification card that is determined to match the identity of the first individual; and
communicate instructions to the autonomous robot vehicle to unlock the first of the securable compartments, but not the second of the securable compartments, to provide access to the first item to the first individual, in response to (a) determining that the location of the mobile user device is within the predetermined distance of the autonomous robot vehicle and (b) verifying the identity and the age of the first individual.

16. The system of claim 15, wherein instructions, when executed by the at least one processor, cause the system to further determine that information in the government-issued photo identification card matches previously stored data of the first individual.

17. The system of claim 15, wherein in the determining, the instructions, when executed by the at least one processor, cause the system to further determine that the live face captured by the camera of the device matches previously stored face data of the first individual.

18. The system of claim 15, wherein the instructions, when executed by the at least one processor, further cause the system to:
communicate a request, to the device, to capture the live face at a different angle;
receive, from the device, a capture of the live face at the different angle; and
determine that the live face is a three-dimensional face based on parallax effects of the live face, wherein the parallax effects are based on the live face captured at the different angle.

19. The system of claim 15, wherein the instructions, when executed by the at least one processor, further cause the system to:
communicate a request to the device to capture a facial movement;
receive, from the device, the facial movement captured by the device; and
determine that the at least one image is an image of is the live face based on the captured facial movement.

20. The system of claim 15, wherein the item for delivery to the first individual is a prescription drug for an individual named in a prescription,
wherein in the determining, the instructions, when executed by the at least one processor, cause the system to determine that the government-issued photo identification card matches the identity of the individual named in the prescription.

21. The system of claim 20, wherein the instructions, when executed by the at least one processor, further cause the system to obtain additional verification by communicating a request, to the device, for responses from the first individual to prompts for information regarding at least one of: a prescribing physician, a pharmacist, a medication, or a medical history and compare the responses with information stored in the memory.

22. An autonomous robot vehicle comprising:
a plurality of securable compartments that are each configured to autonomously lock and unlock, a first of the securable compartments configured to contain a first item for delivery to a first individual, a second of the securable compartments configured to contain a second item for delivery to a second individual;
a camera positioned on the autonomous robot vehicle to capture at least one image of a live face of the first individual;
at least one processor; and
a memory storing instructions which, when executed by the at least one processor, cause the autonomous robot vehicle to, autonomously:
capture, by the camera, at a destination location of the first individual, a government-issued photo identification card of the first individual and the at least one image of the live face of the first individual;
determine that the government-issued photo identification card matches an identity of the first individual by comparing the at least one image of the live face with a face pictured on the government-issued photo identification card;
verify a birthdate on the government-issued photo identification card that is determined to match the identity of the first individual;
determine an age of the first individual by using the birthdate obtained from the government-issued photo identification card when the first item requires age verification for a distribution; and
unlock the first of the securable compartments, but not the second of the securable compartments, to provide access to the first item to the first individual, in response to verifying the identity and the age of the first individual.

23. The autonomous robot vehicle of claim 22, wherein the first item comprises liquor and further comprising a magnetic strip reader or a barcode scanner.

24. The autonomous robot vehicle of claim 22, wherein the instructions further cause the autonomous robot vehicle to confirm validity of the government-issued photo identification card with a government authority.

25. The autonomous robot vehicle of claim 22, wherein the first item includes a prescription drug and the instructions further cause the autonomous robot vehicle to obtain additional verification by requesting, at the destination location, responses from the first individual to prompts for information regarding at least two of: a prescribing physician, a pharmacist, a medication, or a medical history and comparing the responses with information stored in the memory.

26. The autonomous robot vehicle of claim 25, wherein the instructions cause the autonomous robot vehicle to unlock the first of the securable compartments, but not the second of the securable compartments, based on determining that the responses match the information about the prescription stored in the memory.

* * * * *